United States Patent
Gou et al.

(10) Patent No.: US 12,185,311 B2
(45) Date of Patent: Dec. 31, 2024

(54) METHOD AND DEVICE FOR SENDING INDEX INFORMATION, STORAGE MEDIUM, AND ELECTRONIC DEVICE

(71) Applicant: ZTE CORPORATION, Guangdong (CN)

(72) Inventors: Wei Gou, Guangdong (CN); Peng Hao, Guangdong (CN); Chunli Liang, Guangdong (CN); Jing Shi, Guangdong (CN); Xianghui Han, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 584 days.

(21) Appl. No.: 17/427,634

(22) PCT Filed: Jan. 22, 2020

(86) PCT No.: PCT/CN2020/073829
§ 371 (c)(1),
(2) Date: Jul. 31, 2021

(87) PCT Pub. No.: WO2020/156450
PCT Pub. Date: Aug. 6, 2020

(65) Prior Publication Data
US 2022/0104231 A1 Mar. 31, 2022

(30) Foreign Application Priority Data
Feb. 1, 2019 (CN) .......................... 201910105327.8

(51) Int. Cl.
*H04W 72/12* (2023.01)
*H04L 1/00* (2006.01)
(Continued)

(52) U.S. Cl.
CPC ....... *H04W 72/1273* (2013.01); *H04L 1/0003* (2013.01); *H04L 1/1812* (2013.01);
(Continued)

(58) Field of Classification Search
CPC ......... H04W 72/1273; H04W 72/0453; H04W 72/23; H04W 72/1263; H04L 1/0003;
(Continued)

(56) References Cited

U.S. PATENT DOCUMENTS

| | | | | |
|---|---|---|---|---|
| 11,533,131 B2* | 12/2022 | Choi | ...................... | H04L 1/1864 |
| 11,611,412 B2* | 3/2023 | Takeda | .................. | H04L 1/1825 |
| 2021/0336726 A1* | 10/2021 | Takeda | .................. | H04L 1/1819 |

FOREIGN PATENT DOCUMENTS

| | | |
|---|---|---|
| CN | 102316595 A | 1/2012 |
| CN | 102413505 A | 4/2012 |

(Continued)

OTHER PUBLICATIONS

WIPO, International Search Report issued on Apr. 6, 2020.
(Continued)

*Primary Examiner* — Hashim S Bhatti
(74) *Attorney, Agent, or Firm* — Li & Cai Intellectual Property (USA) Office

(57) ABSTRACT

The present application relates to the field of communication technology. Disclosed by the embodiments of the present disclosure are a method and device for sending index information, a non-transitory computer-readable storage medium and an electronic device. The method includes: sending a physical shared channel carrying the index information to a receiving end. The index information is used for instructing the receiving end to count a number of transmissions of the physical shared channel.

13 Claims, 4 Drawing Sheets

(51) Int. Cl.
  *H04L 1/1812* (2023.01)
  *H04L 5/00* (2006.01)
  *H04W 72/0453* (2023.01)
  *H04W 72/1273* (2023.01)
  *H04W 72/23* (2023.01)

(52) U.S. Cl.
  CPC .......... *H04L 5/0012* (2013.01); *H04L 5/0053* (2013.01); *H04W 72/0453* (2013.01); *H04W 72/23* (2023.01)

(58) Field of Classification Search
  CPC ... H04L 1/1812; H04L 5/0012; H04L 5/0053; H04L 1/0041; H04L 1/0072; H04L 1/189; H04L 1/1893; H04L 1/1896; H04L 5/0055; H04L 5/0094; H04L 5/0044; H04L 1/0023; H04L 5/0091; H04L 5/0098
  See application file for complete search history.

(56) References Cited

FOREIGN PATENT DOCUMENTS

| | | |
|---|---|---|
| CN | 107294660 A | 10/2017 |
| CN | 108809534 A | 11/2018 |
| WO | WO2017160350 A1 | 9/2017 |

OTHER PUBLICATIONS

Huawei, HiSilicon. "Remaining issues for dynamic HARQ-ACK codebook determination," Nov. 22, 2015, 3GPP TSG RAN WG1 Meeting #83, Anaheim, USA.

European Patent Office, the partial supplementary European search report dated Sep. 28, 2022 for corresponding EP application 20749143.2.

Huawei, et al., "Remaining issues for dynamic HARQ-ACK codebook determination," 3GPP TSG RAN WG1 Meeting #83, Nov. 22, 2015.

* cited by examiner

METHOD AND DEVICE FOR SENDING INDEX INFORMATION, STORAGE MEDIUM, AND ELECTRONIC DEVICE

CROSS-REFERENCE TO RELATED APPLICATIONS

The present application is a National Stage of International Application No. PCT/CN2020/073829, filed Jan. 22, 2020, which claims priority from the Chinese patent application No. 201910105327.8 filed with the China Patent Office on Feb. 1, 2019, both of which are incorporated in the present application by reference in their entireties.

TECHNICAL FIELD

The present application relates to the field of communication technology, for example, to a method and device for sending index information, a storage medium, and an electronic device.

BACKGROUND

In a mechanism of a related art, a downlink semi-persistent scheduling transmission is mainly used for a periodic service or a quasi-periodic service having a relatively loose requirement for transmission latency and has a relatively long period. Since the period of the semi-persistent scheduling transmission is relatively long, a current mechanism of the semi-persistent scheduling transmission requires a user equipment (UE) to perform a corresponding Hybrid Automatic Repeat Request-Acknowledgement (HARQ-ACK) feedback for a downlink service (such as a Physical Downlink Shared Channel (PDSCH)) of each scheduling transmission period. Therefore, at an opportunity of each scheduling transmission period, the UE performs the HARQ-ACK feedback regardless of whether the PDSCH transmitted by the periodic service is actually detected. In fact, when a base station does not transmit the PDSCH in a scheduling transmission period, the UE also feeds back a Negative Acknowledgement (NACK).

For an Ultra-Reliable and Low Latency Communications (URLLC) service, since the URLLC service has a harsh requirement for latency, when the URLLC service is transmitted by the semi-persistent scheduling transmission, a very short period needs to be configured. When the URLLC service arrives, the URLLC service is able to be transmitted immediately at an opportunity of the nearest transmission period, thereby reducing time for waiting an arrival of the opportunity of the period and ensuring the requirement for the latency. However, it also means that the UE needs to feed back the corresponding HARQ-ACK for each scheduling transmission period, and there will lead to very intensive HARQ-ACK feedbacks. Crucially, for the URLLC service, periods of some URLLC services are not strictly periodic, but quasi-periodical, which results in that a URLLC is not actually transmitted in some scheduling transmission periods.

At present, in related technologies, the semi-persistent scheduling transmission is also considered to transmit an aperiodic URLLC service, and thus the URLLC will not actually be transmitted at timings of most scheduling transmission periods, which will also cause an additional NACK fed back from the UE.

Regarding a problem of unnecessary feedback overhead caused by the additional NACK fed back from the UE in the related art, there is currently no reasonable solution.

SUMMARY

The following is a summary of subject matters detailed in the present application. This summary is not intended to limit the protection scope of the claims.

Embodiments of the present application provide a method and device for sending index information, a storage medium, and an electronic device to at least solve a problem of unnecessary feedback overhead caused by an additional NACK feedback of a UE in the related art.

According to an embodiment of the present disclosure, provided is a method for sending index information, including: transmitting a physical shared channel carrying the index information to a receiving end. The index information is used for instructing the receiving end to count a number of the transmitting of the physical shared channel.

Optionally, transmitting the physical shared channel carrying the index information to the receiving end includes: sending a PDSCH carrying downlink assignment index (DAI) information to the receiving end. The DAI information includes at least one of counter DAI information and total DAI information, the counter DAI information is used for indicating a number of PDSCHs that have been transmitted by a transmitting end in a carrier of the receiving end until a currently transmitted PDSCH, and the total DAI information is used for indicating a sum of a number of PDSCHs that have been transmitted by the transmitting end in the carrier of the receiving end until a current transmission opportunity and a number of PDSCHs queued to be transmitted at the current transmission opportunity.

Optionally, transmitting the PDSCH carrying the DAI information to the receiving end includes: sequentially repeating, encoding and modulating the DAI information to obtain coded modulation symbols of the DAI information; and transmitting the obtained coded modulation symbols of the DAI information by using all or part of resource units (REs) in a physical resource block of the PDSCH.

Optionally, repeating the DAI information includes: repeating the DAI information according to a pre-configured repetition value, the repetition value being determined by at least one of: being instructed by a physical layer, being configured by higher-layer signaling, or agreeing on a default value in advance; encoding the DAI information includes: encoding the DAI information according to a pre-configured encoding mode, the encoding mode of the DAI information being determined by at least one of: being determined to be same as an encoding mode of the PDSCH carrying the DAI information, being determined to be different from the encoding mode of the PDSCH carrying the DAI information, or agreeing on the encoding mode in advance; and modulating the DAI information includes: modulating the DAI information according to a pre-configured modulation mode, the modulation mode of the DAI information being determined by at least one of: being determined to be same as a modulation mode of the PDSCH carrying the DAI information, and agreeing on the modulation mode in advance.

Optionally, before repeating, encoding and modulating the DAI information, the method further includes: configuring a repetition value for the DAI information by at least one of: configuring the repetition value for the DAI information in a Radio Resource Control (RRC) message used for configuring a downlink semi-persistent transmission parameter; and configuring the repetition value for the DAI information in Downlink Control Information (DCI) used for activating a downlink semi-persistent transmission.

Optionally, configuring the repetition value for the DAI information in the DCI used for activating the downlink semi-persistent transmission includes: configuring a set of repetition values by using the RRC message, and selecting a value from the set of repetition values for configuring the repetition value; or configuring the repetition value through the DCI.

Optionally, before transmitting the obtained coded modulation symbols of the DAI information by using all or part of the REs in the physical resource block of the PDSCH, the method further includes: determining a number of REs used to transmit the coded modulation symbols according to the following equation:

$$R_{DAI} = \min\left\{\left\lceil \frac{(D+L) \cdot r \cdot RE_1}{Data} \right\rceil, \lceil A \cdot RE_1 \rceil\right\}.$$

$R_{DAI}$ represents the number of the REs used by the coded modulation symbols of the DAI information; D represents a number of bits of the DAI information; L represents a number of check bits of Cyclic Redundancy Check (CRC), and in a case of the number where bits of the DAI information is less than or equal to 11, L=0; $RE_1$ represents all RE resources able to be used for transmitting the PDSCH or able to be used for transmitting the DAI information, in the physical resource block allocated to the receiving end of a UE for transmitting the PDSCH; Data represents a number of data bits actually transmitted by the PDSCH; A is a coefficient and configured by the transmitting end; and r is a repetition value of the DAI information.

Optionally, before transmitting the obtained coded modulation symbols of the DAI information by using all or part of the REs in the physical resource block of the PDSCH, the method further includes: determining an Orthogonal Frequency Division Multiplexing (OFDM) symbol used in the physical resource block of the PDSCH for the coded modulation symbols of the DAI information. The used OFDM symbol includes: an OFDM symbol immediately adjacent to an OFDM symbol of a reference signal in the physical resource block allocated for the PDSCH, and/or the OFDM symbol of the reference signal.

Optionally, before transmitting the obtained coded modulation symbols of the DAI information by using all or part of the REs in the physical resource block of the PDSCH, the method further includes: mapping the coded modulation symbols of the DAI information on the OFDM symbol used in the physical resource block of the PDSCH, according to a preset first mapping rule; where the first mapping rule includes: first mapping on REs that are not occupied by the reference signal in the OFDM symbol where the reference signal is located, and then mapping on REs in the symbol immediately adjacent to the reference signal; or mapping only on the REs in the symbol immediately adjacent to the reference signal.

Optionally, before transmitting the obtained coded modulation symbols of the DAI information by using all or part of the REs in the physical resource block of the PDSCH, the method further includes: mapping the coded modulation symbols of the DAI information on the OFDM symbol used in the physical resource block of the PDSCH, according to a preset second mapping rule; where the second mapping rule includes: performing the mapping on a first symbol of the PDSCH according to a discrete RE pattern, in a case where half of REs of the first symbol are not able to be full filled by remaining coded modulation symbols corresponding to the DAI information during the mapping; and a discrete RE interval is a value obtained by: dividing a number of the REs of the physical resource block of the PDSCH in the first symbol by a number of the remaining coded modulation symbols corresponding to the DAI information to obtain a result, and rounding the result up or down.

Optionally, sequentially repeating, encoding and modulating the DAI information includes: when the DAI information includes both the counter DAI information and the total DAI information, one of following operations is performed: respectively calculating a number of RE resources or coded modulation symbols to be used by the counter DAI information and a number of RE resources or coded modulation symbols to be used by the total DAI information, and encoding and modulating the counter DAI information and the total DAI information respectively; or taking the counter DAI information and the total DAI information as a whole, calculating a number of RE resources or coded modulation symbols to be used by the counter DAI information and the total DAI information as the whole, and encoding and modulating the counter DAI information and the total DAI information as the whole.

Optionally, sequentially repeating, encoding and modulating the DAI information includes: when the PDSCH performs frequency hopping in a frequency-domain, dividing the coded modulation symbols of the DAI information into two parts, and mapping and transmitting the two parts respectively in a first frequency hopping and a second frequency hopping; where a number of coded modulation symbols of the DAI information carried in the first frequency hopping is obtained by dividing a number of the total coded modulation symbols of the DAI information by 2 and rounding down the dividing result; and others are carried in the second frequency hopping.

Optionally, sequentially repeating, encoding and modulating the DAI information includes: when the PDSCH performs frequency hopping in a frequency-domain, mapping the coded modulation symbols of the DAI information in a first frequency hopping, and when resources available in the first frequency hopping are insufficient, mapping and transmitting remaining coded modulation symbols of the DAI information in a second frequency hopping.

Optionally, transmitting the PDSCH carrying the DAI information to the receiving end includes: transmitting the PDSCH based on semi-persistent scheduling and a first PDSCH based on DCI scheduling to the receiving end simultaneously. A serial number of the DAI in the PDSCH based on the semi-persistent scheduling and a serial number of the DAI in the first PDSCH are consecutive.

Optionally, when the PDSCH based on the semi-persistent scheduling and the first PDSCH based on the DCI scheduling are transmitted to the receiving end simultaneously, the serial number of the DAI in the first PDSCH includes a number of PDSCHs based on the semi-persistent scheduling, and the PDSCHs based on the semi-persistent scheduling do not include the DAI information. The PDSCHs based on the semi-persistent scheduling that do not include the DAI information are not consecutive to greater than M, and M is an integer greater than zero.

Optionally, transmitting the physical shared channel carrying the index information to the receiving end includes: transmitting a Physical Uplink Shared Channel (PUSCH) carrying uplink assignment index (UAI) information to the receiving end, The UAI information includes at least one of counter UAI information and total UAI information, the counter UAI information is used for indicating a number of PUSCHs that have been transmitted by a transmitting end in a carrier configured at the receiving end until a currently transmitted PUSCH, and the total UAI information is used for indicating a sum of a number of PUSCHs that have been transmitted by the transmitting end in the carrier configured at the receiving end until a current transmission opportunity and a number of PUSCHs queued to be transmitted at the current transmission opportunity.

According to another embodiment of the present disclosure, provided is a method for feeding back acknowledgement information, including: receiving a DCI activation command in a semi-persistent scheduling transmission, and the DCI activation command being used for instructing to activate a channel transmission; and feeding back a HARQ-ACK corresponding to the DCI activation command.

Optionally, feeding back the HARQ-ACK corresponding to the DCI activation command including: when a HARQ-ACK for DCI activation and a HARQ-ACK of a first PDSCH that is actually transmitted after a PDSCH based on semi-persistent scheduling transmission is activated are finally transmitted on a same Physical Uplink Control Channel (PUCCH) or a same PUSCH, generating an HARQ-ACK only for the first PDSCH which is actually transmitted, and transmitting the HARQ-ACK in the PUCCH or the PUSCH.

According to another embodiment of the present disclosure, provided is a method for feeding back acknowledgement information, including: sending a DCI activation command to a receiving end. The DCI activation command carries a PUCCH resource indication field of a HARQ-ACK, and the PUCCH resource indication field of the HARQ-ACK is used for indicating resources of the HARQ-ACK for the DCI activation command in a slot or a subslot.

Optionally, the method further includes: setting a slot/subslot position of the HARQ-ACK corresponding to the DCI activation command by using at least one of the following methods: agreeing on that the slot/subslot position is a slot or a subslot where the DCI activation command is carried; agreeing on that the slot/subslot position is a N-th uplink slot/subslot after a slot or a subslot where the DCI activation command is carried, and N is one of 1, 2 or 3; indicating the slot/subslot position of the HARQ-ACK for the DCI activation by using a control channel element (CCE) index of the DCI activation command; where a minimum CCE index of the DCI activation command is multiplied by P and then divided by num, and an obtained value is rounded down to obtain a value Q; where num is a number of CCEs in a configured control information resource set of the receiving end, P is a number of slot/subslot positions corresponding to the HARQ-ACK, and the value Q represents a slot or subslot corresponding to one HARQ-ACK; or in a case where the DCI activation command is located in a first half of the slot or subslot, agreeing on that the slot or subslot of the DCI activation is the present slot or subslot; and in a case where the DCI activation command is located in a second half of the slot or subslot, agreeing on that the slot or subslot of the DCI activation is a next slot or subslot.

According to another embodiment of the present disclosure, provided is a device for sending index information, including: a first transmitting module, configured to transmit a physical shared channel carrying the index information to a receiving end. The index information is used for instructing the receiving end to count a number of the transmitting of the physical shared channel.

According to another embodiment of the present disclosure, provided is a device for feeding back acknowledgement information, including: a receiving module, configured to receive a DCI activation command in a semi-persistent scheduling transmission, and the DCI activation command being used for instructing to activate a channel transmission; and a feedback module, configured to feedback a HARQ-ACK corresponding to the DCI activation command.

According to another embodiment of the present disclosure, provided is a device for feeding back acknowledgement information, including: a second transmitting module, configured to transmit a DCI activation command to a receiving end. The DCI activation command carries a PUCCH resource indication field of a HARQ-ACK, and the PUCCH resource indication field of the HARQ-ACK is used for indicating resources of the HARQ-ACK for the DCI activation command in a slot or a subslot.

According to another embodiment of the present disclosure, provided is a storage medium storing a computer program thereon. The computer program is configured to perform a step in any one of the above-mentioned method embodiments.

According to another embodiment of the present disclosure, provided is an electronic device, including a memory and a processor. The memory stores a computer program therein, and the processor is configured to execute the computer program to perform a step in any one of the above-mentioned method embodiments.

According to the method for sending index information provided by the embodiments of the present disclosure, the physical shared channel carrying index information is transmit to the receiving end, and the index information is used for instructing the receiving end to count the number of the transmitting of the physical shared channel, which helps the receiving end to discover whether a physical shared channel transmission actually occurs at an opportunity of a semi-persistent scheduling period, and helps the receiving end to discover whether it has missed detection when detecting the physical shared channel. Therefore, an unnecessary HARQ-ACK overhead is reduced, and there is no additional feedback overhead when the period is configured to be small.

After reading and understanding the drawings and detailed description, other aspects can be understood.

BRIEF DESCRIPTION OF THE DRAWINGS

The accompanying drawings described herein are used to provide a further understanding for the present disclosure, and are constitute a part of the present application. An illustrative embodiment of the present disclosure and its description are intended to explain the present disclosure, but not to constitute an improper limitation to the present disclosure. In the accompanying drawings.

DETAILED DESCRIPTION

Figure 1:
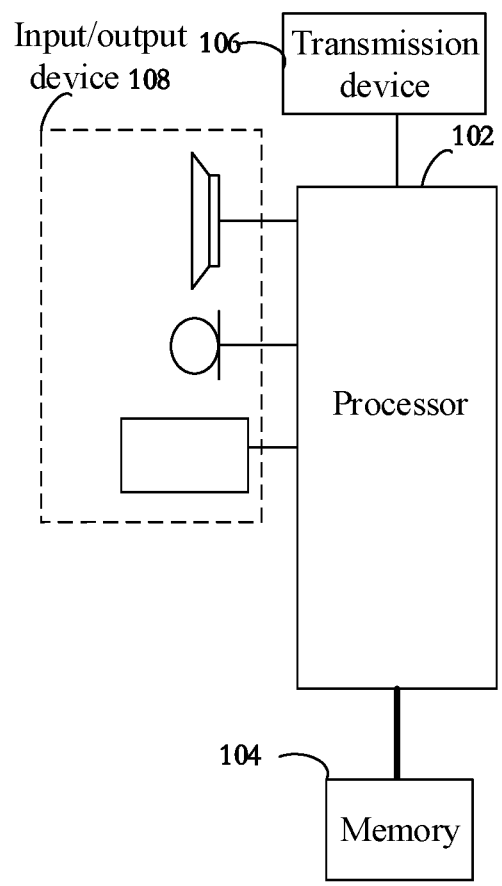
FIG. 1 is a block diagram of a hardware structure of a mobile terminal in a method in an embodiment of the present disclosure.

The present application will be described in detail below with reference to the accompanying drawings in conjunction with embodiments. It should be noted that the embodiments of the present application and features therein may be combined with each other in any manner as long as they are not contradictory.

It should be also noted that terms "first", "second", and the like in the description, claims and the accompanying drawings of the present application are used for a purpose of distinguishing similar objects instead of indicating a specific order or sequence.

In a mechanism of a related art, a downlink semi-persistent scheduling transmission is mainly used for a periodic service or a quasi-periodic service having a relatively loose requirement for transmission latency and has a relatively long period. This kind of semi-persistent scheduling transmission has some advantages. For example, only one piece of control signaling for activating the semi-persistent transmission needs to be sent at a beginning generally, and thus, there is no need to send control signaling (usually downlink/uplink control signaling) for scheduling a transmission at an opportunity of each period, thereby reducing an overhead for the control signaling. Since the period of the semi-persistent scheduling transmission is relatively long, a current mechanism of the semi-persistent scheduling transmission requires a UE to perform a corresponding HARQ-ACK feedback for a downlink service (such as a PDSCH) of each scheduling transmission period. Therefore, at an opportunity of each scheduling transmission period, the UE performs the HARQ-ACK feedback regardless of whether a PDSCH transmitted by the periodic service is actually detected. For example, when no PDSCH is detected, the UE feeds back a NACK, and when the PDSCH is detected, an ACK or the NACK is fed back according to an actual decoding situation. In fact, when a base station does not transmit the PDSCH in a scheduling transmission period, the UE also feeds back the NACK.

For an URLLC service, since the URLLC service has a harsh requirement for latency, when the URLLC service is performed by the semi-persistent scheduling transmission, a very short period needs to be configured. When the URLLC service arrives, the URLLC service is able to be transmitted immediately at an opportunity of the nearest transmission period, thereby reducing time for waiting an arrival of the opportunity of the period and ensuring the requirement for the latency. However, it also means that the UE needs to feed back the corresponding HARQ-ACK for each scheduling transmission period, and there will lead to very intensive HARQ-ACK feedbacks. Crucially, for the URLLC service, periods of some URLLC services are not strictly periodic, but quasi-periodical, which results in that an URLLC is not actually transmitted in some scheduling transmission periods.

At present, some companies propose to use the semi-persistent scheduling transmission to transmit an aperiodic URLLC service, so that the URLLC will not actually be transmitted at timings of most scheduling transmission periods. However, this will also cause an additional NACK fed back from the UE.

To solve the above problems, the following solutions are provided.

First Embodiment

An embodiment of a method for sending index information provided in the first embodiment of the present application may be executed by a mobile terminal, a computer terminal or a similar computing device. Taking the method being executed by the mobile terminal as an example, FIG. 1 is a block diagram of a hardware structure of the mobile terminal in the method in the embodiment of the present disclosure. As shown in FIG. 1, a mobile terminal 10 may include one or more (only one is shown in FIG. 1) processors 102 (which may include, but are not limited to, a processing device such as a microprocessor (e.g., a Micro Control Unit (MCU)) or a programmable logic device (e.g., a Field Programmable Gate Array (FPGA))) and a memory 104 for storing data. Optionally, the above-mentioned mobile terminal may further include a transmission device 106 and an input/output device 108 for communication functions. It should be understood by those having ordinary skill in the art that the structure shown in FIG. 1 is only for illustration, and does not limit the structure of the above-mentioned mobile terminal. For example, the mobile terminal 10 may include more or fewer components than those shown in FIG. 1, or have a different configuration from that shown in FIG. 1.

The memory 104 may be used to store a computer program, for example, a software program and a module of application software, such as a computer program for sending index information in the embodiments of the present disclosure. The processor 102 executes various functional applications and data processing, i.e., realizes the above-mentioned method, by executing the computer program stored in the memory 104. The memory 104 may include a high-speed random access memory, and may also include a non-volatile memory, such as one or more magnetic storage devices, a flash memory, or other non-volatile solid-state memories. In some examples, the memory 104 may further include a memory remotely provided with respect to the processor 102, and the remote memory may be connected to the mobile terminal 10 through a network. Examples of the above-mentioned network include, but are not limited to, the Internet, a corporate intranet, a local area network, a mobile communication network, and combinations thereof.

The transmission device 106 is used for receiving or sending data via a network. A specific example of the above-mentioned network may include a wireless network provided by a communication provider of the mobile terminal 10. In an example, the transmission device 106 includes a network interface controller (NIC), which can be connected to another network device through a base station to communicate with the Internet. In an example, the transmission device 106 may be a radio frequency (RF) module, which is used for communicating with the Internet in a wireless manner.

Figure 2:
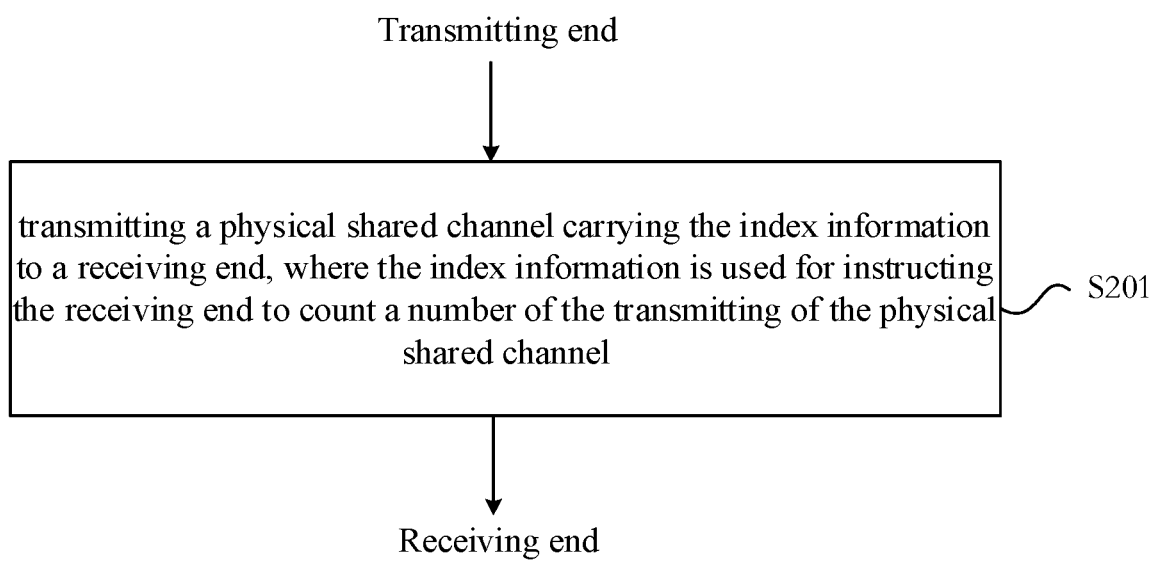
FIG. 2 is a flowchart of sending index information in an embodiment of the present application.

The embodiment of the present disclosure provides the method for sending index information. FIG. 2 is a flowchart of sending index information in the embodiment of the present disclosure. As shown in FIG. 2, the method includes the followings.

In step S201, a physical shared channel carrying the index information is transmitted to a receiving end, and the index information is used for instructing the receiving end to count a number of the transmitting of the physical shared channel.

By using the above method, the physical shared channel carrying index information is transmitted to the receiving end, and the index information is used for instructing the receiving end to count the number of the transmission of the physical shared channel, which helps the receiving end to discover whether the transmission of the physical shared channel actually occurs at an opportunity of a semi-persistent scheduling period, and helps the receiving end to discover whether itself has missed detection when detecting the physical shared channel. Therefore, an unnecessary HARQ-ACK overhead is reduced, and there is no additional feedback overhead in a case where the period is configured to be small.

It should be noted that a transmitting end herein may be a base station, which corresponds to adopting a semi-persistent scheduling transmission for a downlink transmission; and the transmitting end herein may also be a UE, which corresponds to adopting the semi-persistent scheduling transmission for an uplink transmission. The transmitting end carries and transmits DAI information (or other information, such as all/part of information of control signaling in the related art) through a PDSCH channel, such operation includes transmitting the DAI information by using all or part of RE resources in a Resource Block (RB) resource allocated for the UE for transmitting the PDSCH (which is a PUSCH in a case of the uplink transmission).

In an embodiment, when the transmitting end is a base station and the receiving end is the UE, the above step S201 can be implemented by sending the PDSCH carrying the DAI information to the receiving end. The DAI information includes counter DAI information and/or total DAI information. The counter DAI information is used for indicating a number of PDSCHs (including a currently transmitted PDSCH) that have been transmitted by the transmitting end in a carrier of the receiving end until a currently transmitted PDSCH. The total DAI information is used for indicating a sum of a number of PDSCHs (including a PDSCH at a current transmission opportunity) that have been transmitted by the transmitting end in the carrier of the receiving end until a current transmission opportunity and a number of PDSCHs queued to be transmitted at the current transmission opportunity.

In an embodiment, transmitting the PDSCH carrying the DAI information to the receiving end can be implemented by sequentially repeating, encoding and modulating the DAI information to obtain coded modulation symbols of the DAI information, and transmitting the obtained coded modulation symbols of the DAI information by using all or part of the REs in the physical RB of the PDSCH.

In an embodiment, repeating the DAI information includes repeating the DAI information according to a pre-configured repetition value. The repetition value is determined by at least one of being instructed by a physical layer, being configured by higher-layer signaling, or agreeing on a default value in advance.

Encoding the DAI information includes encoding the DAI information according to a pre-configured encoding mode. The encoding mode of the DAI information is determined by at least one of being determined to be same as an encoding mode of the PDSCH carrying the DAI information, being determined to be different from the encoding mode of the PDSCH carrying the DAI information, or agreeing on the encoding mode in advance.

Modulating the DAI information includes modulating the DAI information according to a pre-configured modulation mode. The modulation mode of the DAI information is determined by at least one of being determined to be same as a modulation mode of the PDSCH carrying the DAI information, and agreeing on the modulation mode in advance.

In an embodiment, before repeating, encoding and modulating the DAI information, the method further includes configuring the repetition value for the DAI information by at least one of configuring the repetition value for the DAI information in a RRC message used for configuring a downlink semi-persistent transmission parameter, and configuring the repetition value for the DAI information in DCI used for activating the downlink semi-persistent transmission.

In an embodiment, configuring the repetition value for the DAI information in the DCI used for activating the downlink semi-persistent transmission includes configuring a set of repetition values by using the RRC message, and selecting a value from the set of repetition values to configure the repetition value; or configuring the repetition value through the DCI.

In an embodiment, before transmitting the obtained coded modulation symbols of the DAI information by using all or part of the REs in the physical RB of the PDSCH, the method further includes: determining a number of REs used to transmit the coded modulation symbols according to the following equation:

$$R_{DAI} = \min\left\{\left\lceil \frac{(D+L) \cdot r \cdot RE_1}{\text{Data}} \right\rceil, \lceil A \cdot RE_1 \rceil\right\}.$$

$R_{DAI}$ represents the number of the REs used by the coded modulation symbols of the DAI information; D represents a number of bits of the DAI information; L represents a number of check bits of CRC, and in a case where the number of the bits of the DAI information is less than or equal to 11, L=0. $RE_1$ represents all RE resources able to be used for transmitting the PDSCH or able to be used for transmitting the DAI information, in the physical RB allocated to the receiving end for transmitting the PDSCH, Data represents a number of data bits actually transmitted by the PDSCH, A is a coefficient and configured by the transmitting end, and r is the repetition value.

In an embodiment, before transmitting the obtained coded modulation symbols of the DAI information by using all or part of the REs in the physical RB of the PDSCH, the method further includes determining an OFDM symbol used in the physical RB of the PDSCH for the coded modulation symbols of the DAI information. The used OFDM symbol includes an OFDM symbol immediately adjacent to an OFDM symbol of a reference signal in the physical RB allocated for the PDSCH, and/or the OFDM symbol of the reference signal.

In an embodiment, before transmitting the obtained coded modulation symbols of the DAI information by using all or part of the REs in the physical RB of the PDSCH, the method further includes mapping the coded modulation symbols of the DAI information on the OFDM symbol used in the physical RB of the PDSCH, according to a preset first mapping rule. The first mapping rule includes first mapping on REs that are not occupied by the reference signal in the OFDM symbol where the reference signal is located, and then mapping on REs in the symbol immediately adjacent to the reference signal, or includes mapping only on the REs in the symbol immediately adjacent to the reference signal.

In an embodiment, before transmitting the obtained coded modulation symbols of the DAI information by using all or part of the REs in the physical RB of the PDSCH, the method further includes: mapping the coded modulation symbols of the DAI information on the OFDM symbol used in the physical RB of the PDSCH, according to a preset second mapping rule. The second mapping rule includes: performing the mapping on a first symbol of the PDSCH according to a discrete RE pattern, in a case where half of REs of the first symbol are not able to be full filled by remaining coded modulation symbols of the DAI information during the mapping. A discrete RE interval is a value obtained by dividing a number of the REs of the physical RB of the PDSCH in the first symbol by a number of the remaining coded modulation symbols of the DAI information to obtain a result, and rounding the result up or down.

In an embodiment, sequentially repeating, encoding and modulating the DAI information includes: when the DAI information includes both the counter DAI information and the total DAI information, one of following operations is performed: respectively calculating a number of RE resources or coded modulation symbols to be used by the counter DAI information and a number of RE resources or coded modulation symbols to be used by the total DAI information, and encoding and modulating the counter DAI information and the total DAI information respectively; or taking the counter DAI information and the total DAI information as a whole, calculating a number of RE resources or coded modulation symbols to be used by the counter DAI information and the total DAI information as the whole, and encoding and modulating the counter DAI information and the total DAI information as the whole.

In an embodiment, sequentially repeating, encoding and modulating the DAI information includes: in a case where the PDSCH performs frequency hopping in a frequency-domain, dividing the coded modulation symbols of the DAI information into two parts, and mapping and transmitting the two parts respectively in a first frequency hopping and a second frequency hopping. A number of coded modulation symbols of the DAI information carried in the first frequency hopping is obtained by dividing a number of total coded modulation symbols of the DAI information by 2 and rounding down the dividing result. The other coded modulation symbols are carried in the second frequency hopping.

In an embodiment, sequentially repeating, encoding and modulating the DAI information includes: in a case where the PDSCH performs the frequency hopping in frequency-domain, mapping the coded modulation symbols of the DAI information in the first frequency hopping, and when resources available in the first frequency hopping are insufficient, mapping and transmitting remaining coded modulation symbols of the DAI information in the second frequency hopping.

In an embodiment, transmitting the PDSCH carrying the DAI information to the receiving end includes: while transmitting the PDSCH based on the semi-persistent scheduling to the receiving end, a first PDSCH based on DCI scheduling is also transmitted. A serial number of the DAI in the PDSCH based on the semi-persistent scheduling and a serial number of DAI in the first PDSCH are consecutive. The first PDSCH herein generally refers to a PDSCH with the DCI scheduling, and the PDSCH based on the semi-persistent scheduling does not have the DCI.

In an embodiment, when transmitting the first PDSCH based on the DCI scheduling while transmitting the PDSCH based on the semi-persistent scheduling to the receiving end, the serial number of the DAI in the first PDSCH includes a number of PDSCHs based on the semi-persistent scheduling, and the PDSCHs based on the semi-persistent scheduling do not include the DAI information. The PDSCHs based on the semi-persistent scheduling that do not include the DAI information are not consecutive to greater than M and M is an integer greater than zero.

In an embodiment, transmitting the physical shared channel carrying the index information to the receiving end includes: transmitting a PUSCH carrying UAI information to the receiving end. The UAI information includes counter UAI information and/or total UAI information. The counter UAI information indicates a number of PUSCHs that have been transmitted by the transmitting end in a configured carrier until a currently transmitted PUSCH. The total UAI information indicates a sum of a number of PUSCHs that have been transmitted by the transmitting end in the carrier configured at the receiving end until a current transmission opportunity and a number of PUSCHs queued to be transmitted at the current transmission opportunity.

A configuration and a transmission of the UAI information refer to the above-mentioned DAI related method embodiments.

In the embodiment, a device for sending index information is further provided, and the device is used to implement the above-mentioned embodiments and optional implementations, and those that have been described will not be repeated. As used below, a term "module" is a combination of software and/or hardware that can implement predetermined functions. Although the device described in the following embodiments are preferably implemented by software, implementation by hardware or a combination of software and hardware is also possible and conceived.

Figure 3:
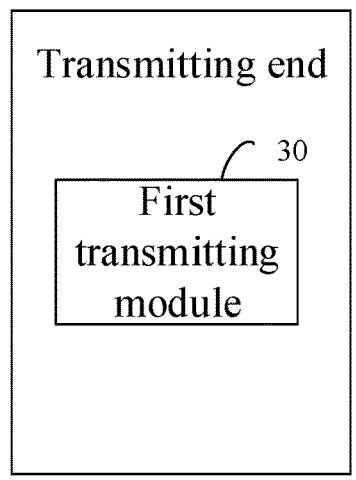
FIG. 3 is a structural block diagram of a device for sending index information according to an embodiment of the present disclosure.

FIG. 3 is a structural block diagram of the device for sending index information according to an embodiment of the present disclosure. As shown in FIG. 3, the device includes the followings.

A first transmitting module 30 is used for transmitting a physical shared channel carrying the index information to a receiving end. The index information is used for instructing the receiving end to count a number of the transmitting of the physical shared channel.

By using the above device, the physical shared channel carrying index information is transmitted to the receiving end, and the index information is used for instructing the receiving end to count the number of the transmission of the physical shared channel, which helps the receiving end to discover whether the transmission of the physical shared channel actually occurs at an opportunity of a semi-persistent scheduling period, and helps the receiving end to discover whether itself has missed detection when detecting the physical shared channel. Therefore, an unnecessary HARQ-ACK overhead is reduced, and there is no additional feedback overhead in a case where the period is configured to be small.

In order to better understand relevant solutions in the embodiments of the present disclosure, following specific examples are used to illustrate a specific implementation process of the method for sending index information in the embodiments of the present disclosure.

The following mainly describes that during a transmission of a Downlink Semi-persistent scheduling (DL SPS) PDSCH, it is necessary to carry DAI information in the PDSCH.

The DAI helps a UE to discover whether the transmission of the PDSCH actually occurs at an opportunity of a semi-persistent scheduling period, and helps the UE to discover whether itself has missed detection when detecting the PDSCH, thereby reducing an unnecessary HARQ-ACK overhead, so that in the case where the period is configured to be small, an additional feedback overhead cannot be occurred.

A base station configures relevant information of the downlink semi-persistent scheduling transmission for the UE through RRC signaling and activates the downlink semi-persistent scheduling transmission through DCI signaling in a physical layer, and then the base station allows downlink data to be transmitted at each configured semi-persistent scheduling transmission opportunity (when it is a downlink transmission). If the base station does not actually have any downlink data to transmit at a semi-persistent scheduling transmission opportunity, then it may not transmit the downlink data at the semi-persistent scheduling transmission opportunity. If the base station has downlink data that needs to be transmitted at the semi-persistent scheduling transmission opportunity, the base station will transmit the downlink data at the semi-persistent scheduling transmission opportunity according to relevant regulations in the RRC signaling and the DCI signaling. Obviously, after being activated by the DCI signaling in the physical layer, at a subsequent semi-persistent scheduling transmission opportunity, the DCI control signaling no longer needs to be sent, but the PDSCH is transmitted directly.

When the downlink semi-persistent scheduling transmission is used to transmit an aperiodic URLLC service with a demanding requirement for latency, the downlink semi-persistent scheduling transmission period needs to be configured to be small to reduce the latency of waiting for the transmission opportunity before transmitting the data. However, the base station does not actually transmit the PDSCH at most of the downlink semi-persistent scheduling transmission opportunities, thus the UE still needs to perform detection and HARQ-ACK feedback.

At each semi-persistent scheduling transmission period, when the PDSCH is actually transmitted, DAI information is carried and transmitted through a resource for transmitting the PDSCH. If no PDSCH is actually transmitted, the resource for transmitting the PDSCH will not be used to carry the DAI information. Counter DAI is included in the DAI information, and when multiple carriers or bandwidth parts (BWPs) work at the same time, total DAI is also included in the DAI information. The counter DAI indicates how many PDSCHs have actually been transmitted until a currently transmitted PDSCH (including the currently transmitted PDSCH). The total DAI indicates a total number of PDSCHs that have been transmitted and planned to be transmitted in all carriers or BWPs until a current transmission opportunity (including the PDSCHs that have been transmitted and the PDCSHs planned to be transmitted in all carriers or BWPs at the current transmission opportunity).

After receiving the DAI information, the UE will discover whether there is any missed detection according to a number of PDSCHs which have been received by itself and the DAI information. In this embodiment, it can also be discovered whether the base station actually transmits a PDSCH during the semi-persistent scheduling period. Since a number of semi-persistent scheduling periods actually experienced so far is known by the UE, and then the UE will discover semi-persistent scheduling periods in which no PDSCH is actually transmitted by referring the DAI information. Therefore, when the HARQ-ACK feedback is performed, no corresponding HARQ-ACK information will be generated for the semi-persistent scheduling periods in which no transmission is actually performed.

For those PDSCHs in the semi-persistent scheduling periods, a semi-persistent configuration may be used to determine positions for feeding back corresponding HARQ-ACKs. For example, for PDSCHs in n consecutive semi-persistent scheduling periods, HARQ-ACKs may be fed back on the same PUCCH. Of course, a value of n may be determined according to a requirement for latency of a specific URLLC service, that is, a HARQ-ACK feedback corresponding to a first PDSCH cannot exceed the required latency. For example, in FIG. 1, taking an NR system as an example, n is equal to 7, so that HARQ-ACKs corresponding to PDSCHs in 7 consecutive semi-persistent scheduling periods are fed back in one PUCCH, and from a beginning of the first PDSCH to an end of the transmission of the HARQ-ACKs, actual elapsed time is about 0.64 ms. Further, it may be also considered transmitting a k1 value through the PDSCH, so that the k1 value (which is a parameter describing the HARQ-ACK timing, and for which reference may be made to a definition in a NR protocol) can be used to flexibly indicate a slot or a subslot in which an HARQ-ACK of a PDSCH in each semi-persistent scheduling period is transmitted.

Figure 4:
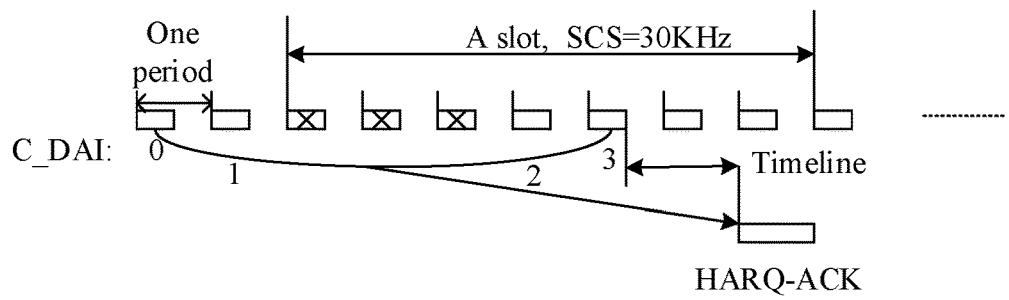
FIG. 4 is a schematic diagram of a use of DAI information in one carrier in an embodiment of the present disclosure.

FIG. 4 is a schematic diagram of the use of DAI information in one carrier in an embodiment of the present disclosure. As shown in FIG. 4, when one carrier is used, only the counter DAI (abbreviated as C_DAI) is used. In FIG. 4, it is assumed that a carrier interval is 30 KHz, a slot contains 14 OFDM symbols, and a semi-persistent scheduling period is 2 OFDM. The C_DAI occupies 2 bits, and a counting rule is cycle counting. In counting in a first cycle, C_DAI=0 means 1 PDSCH, C_DAI=1 means 2 PDSCHs, C_DAI=2 means 3 PDSCHs, and C_DAI=3 means 4 PDSCHs. Then the cycle is started, in a second cycle, C_DAI=0 means 1+4 PDSCHs, C_DAI=1 means 2+4 PDSCHs, C_DAI=2 means 3+4 PDSCHs, C_DAI=3 means 4+4 PDSCHs, and so on. The "Timeline" as shown in FIG. 4 represents a period of time, that is, it takes at least this long time to prepare all HARQ-ACKs. Actually, this period of time is mainly decoding time of a most recent PDSCH transmission and time for preparing the HARQ-ACKs, and an earlier PDSCH has actually been decoded.

On the left side of FIG. 4, semi-persistent transmission periods corresponding to a first HARQ-ACK transmission corresponds to 8 semi-persistent transmission periods, in which 5 periods are used for transmitting, and 3 periods (indicated by X in FIG. 4) are not used for transmitting. At this time, a value of the parameter C_DAI is shown in FIG. 4. When the UE receives C_DAI=2, since 6 semi-persistent scheduling periods have actually been experienced, but C_DAI=2, it is known by the UE that the 3 PDSCHs have actually been transmitted. In addition, since C_DAI=0 and 1 have been received in advance, the UE is aware of the 3 semi-persistent scheduling transmission opportunities at which the PDSCHs are not actually transmitted. Therefore, HARQ-ACK feedbacks are not performed for the PDSCHs that are not actually transmitted.

Figure 5:
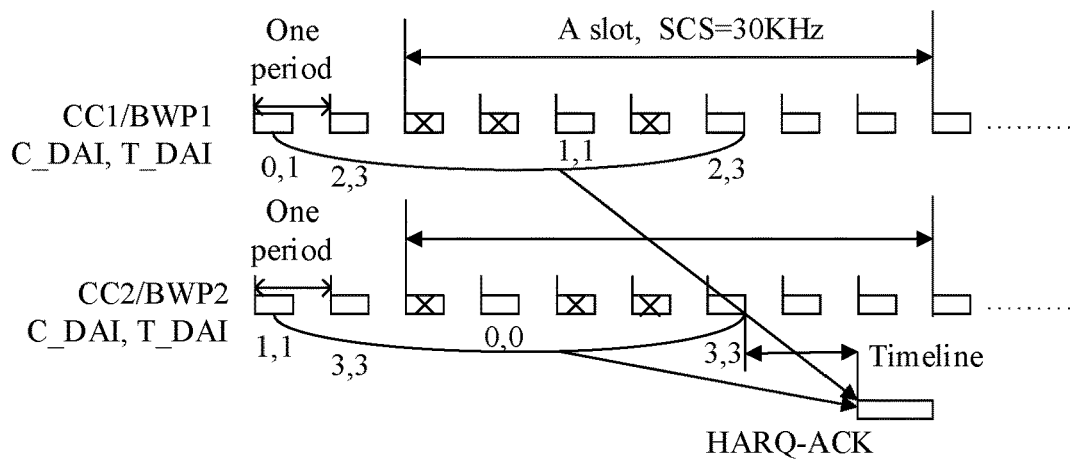
FIG. 5 is a schematic diagram of a use of DAI information in two carriers in an embodiment of the present disclosure.

FIG. 5 is a schematic diagram of the use of DAI information in two carriers in an embodiment of the present disclosure. As shown in FIG. 5, when there are two carriers, the DAI information mainly differs in both C_DAI and T_DAI (which stands for the total DAI). A counting principle of T_DAI is the same as that of C_DAI. In the case of multiple carriers, it is necessary to follow a rule of frequency domain first and time domain later (i.e., a DAI parameter in each component carrier (CC) in a current scheduling opportunity is numbered firstly, and then a DAI parameter in each CC in a next scheduling opportunity is numbered). For example, in FIG. 5, at first scheduling opportunities of CC1 and CC2, the PDSCHs are actually transmitted, then the DAI are numbered as: C_DAI=0 and T_DAI=1 in CC1; and C_DAI=1 and T_DAI=1 in CC2, which means that, in CC1, C_DAI=0 indicates that a total of 1 PDSCH is transmitted until a currently transmitted PDSCH, i.e., one PDSCH is transmitted in CC1; and T_DAI=1 indicates a number of PDSCHs that have been transmitted and planned to be transmitted in both CC1 and CC2 until a current transmission opportunity, i.e., one PDSCH has already been transmitted in CC1 and one PDSCH is planned to be transmitted in CC2 until the current transmission opportunity, and thus T_DAI=1, which means there are two PDSCHs in total.

In FIG. 5, a first C_DAI=2 and T_DAI=3 in CC1 means that: C_DAI=2 means that 3 PDSCHs have been transmitted in total until the currently transmitted PDSCH, that is, at the first transmission opportunity, one PDSCH is transmitted in CC1, one PDSCH is transmitted in CC2, and at a second transmission opportunity, one PDSCH is transmitted in CC1; and T_DAI=3 means that: until the current transmission opportunity, in both CC1 and CC2, at the first transmission opportunity, one PDSCH is transmitted in each of CC1 and CC2, and at the second transmission opportunity, one PDSCH is transmitted in CC1, and one PDSCH is planned to be transmitted in CC2; and thus there are 4 PDSCHs in total, and T_DAI=3.

Further, the DAI and the k1 value (which describes a number of slots or subslots between a slot or a subslot in which a PDSCH is located and a slot or a subslot in which its corresponding HARQ-ACK is located) may also be simultaneously transmitted in the PDSCH. In fact, all of the relevant parameters in the DCI in the related art are able to be carried by the PDSCH, thereby reducing an overhead of the DCI. However, whether or not to adopt this method depends on a requirement for reliability of the DCI. For example, URLLC requires the DCI transmission to have high reliability, which causes the DCI to use a very low bit rate; and one piece of DCI information needs almost all Physical Downlink Control Channel (PDCCH) resources to carry, which leads to a serious PDCCH congestion problem, i.e., multiple DCIS that need to be transmitted cannot be transmitted at the same time. In this case, it is a good method to carry all or part of information in the DCI in the PDSCH. A specific method for carrying DCI is the same in principle as that for carrying DAI described below.

The following will specifically describe how to carry DAI information in the PDSCH.

The DAI information is carried in the PDSCH by the following means.

Bits of the DAI information are repeated according to a configured repetition value, coded according to a configured encoding mode, and then modulated according to a configured modulation mode, to obtain coded modulation symbols of the DAI information. The coded modulation symbols are transmitted through all or part of of RE resources in an RB (which is also called PRB, Physical Resource Block or Resource Block) of a PDSCH allocated for a UE.

Here, determination of the repetition value, the encoding mode, and the modulation mode can adopt a method such as explicit signaling configuration or implicit acquisition. The method of implicit acquisition includes: when the repetition value is not configured, a pre-agreed default value is adopted; for example, a certain repetition value in a table of repetition values is agreed, and the repetition value should be a frequently used repetition value; for the encoding mode, a pre-agreed encoding mode is adopted; for example, since the DAI belongs to a type of control information (e.g., in a NR system, the control information is coded by using polar codes, and a data channel is coded by using Low Density Parity Check (LDPC) codes), it may be agreed to adopt an encoding mode of a control channel or an encoding mode same as that of the PDSCH; and for the modulation mode, it is agreed to adopt a same modulation mode as that of the PDSCH carrying the DAI information. That is, when a modulation mode is configured to modulate the PDSCH, this modulation mode is adopted by default for modulating the DAI. The same modulation mode can ensure that signal amplitudes of PDSCH data and the DAI information are relatively uniform during transmitting, and it is easy to process.

The repetition value of the DAI information is configured by a base station, for example, the repetition value is configured in an RRC message that configures transmission parameters of a DL SPS PDSCH, or configured in the DCI that activates the DL SPS PDSCH. If the DCI that activates the DL SPS PDSCH is used to configure the repetition value, a set of repetition values may be configured in the RRC message first, and a value is selected from the set of repetition values for configuration by the DCI; or the repetition value may be directly configured by the DCI.

The RE resources (which is also known as a total number of the coded modulation symbols during the transmission of the DAI information, the coded modulation symbols correspond to the RE resources one-by-one) used by the coded modulation symbols of the DAI information are determined by specifically:

$$R_{DAI} = \min\left\{\left\lceil \frac{(D+L) \cdot r \cdot RE_1}{\text{Data}} \right\rceil, \lceil A \cdot RE_1 \rceil\right\}.$$

Here, $R_{DAI}$ represents the coded modulation symbols of the DAI, or a number of REs used by the coded modulation symbols of the DAI; D represents a number of bits of the DAI information; L represents a number of check bits of CRC, and in a case where the number of the bits of the DAI information is less than or equal to 11, L=0; $RE_1$ represents all RE resources which are able to be used for transmitting the PDSCH or the DAI in an RB allocated for transmitting the PDSCH ($RE_1$ is actually a total number of REs that effectively transmit data of the PDSCH or the DAI, except for REs occupied by various reference signals, system information, etc., in the RB allocated for the PDSCH); Data represents a number of data bits actually transmitted by the PDSCH; A is a coefficient and configured by the base station; and r is the repetition value.

An OFDM symbol in the RB corresponding to the PDSCH used by the coded modulation symbols corresponding to the DAI information, includes: a symbol that is near a symbol of a reference signal in the RB allocated for the PDSCH, and the used OFDM symbol is allowed to include the symbol of the reference signal but except for an RE occupied by the reference signal. Here, the reference signal may optionally be a Demodulation Reference Signal (DMRS), or other reference signals.

A mapping rule for mapping the coded modulation symbols corresponding to the DAI information on the used symbol in the RB corresponding to the PDSCH, includes: first mapping on REs that are not occupied by the reference signal in the symbol where the reference signal is located, and then mapping on REs in a symbol immediately adjacent to the reference signal (here, the symbol on the left side of the symbol of the reference signal may be mapped on first, and then the symbol on the right side of symbol of the reference signal is mapped on).

When mapping the coded modulation symbols corresponding to the DAI information, if remaining coded modulation symbols of the DAI information cannot fill half of REs of one symbol of the PDSCH, the mapping is performed on the symbol according to a discrete RE pattern. A discrete RE interval is obtained by dividing a number of the REs of the RB corresponding to the PDSCH in the symbol by a number of the remaining coded modulation symbols of the DAI information, and rounding down the dividing result.

When the DAI information includes both counter DAI information and total DAI information, numbers of RE resources to be used or coded modulation symbols to be transmitted of the counter DAI information and the total DAI information are calculated respectively according to their respective repetition values, and the counter DAI information and the total DAI information are encoded and modulated respectively; or a number of RE resources to be used or coded modulation symbols to be transmitted of the counter DAI information and the total DAI information is calculated as a whole according to one repetition value, and the counter DAI information and the total DAI information is encoded and modulated as the whole.

When the PDSCH performs frequency hopping in frequency-domain, i.e., symbols of a front part of the PDSCH are transmitted in some RBs, and symbols of a candidate part of the PDSCH are transmitted in other RBs, the coded modulation symbols of the DAI information are divided into two parts, and the two parts are mapped on and transmitted in a first frequency hopping and a second frequency hopping respectively. A rule for determining the coded modulation symbols of the DAI information in the first and second frequency hopping are the same as a rule when the PDSCH does not perform frequency hopping. The coded modulation symbols of the DAI information are divided into two parts, which specifically include: a number of the coded modulation symbols of the DAI information carried in the first frequency hopping is obtained by dividing a number of the total coded modulation symbols of the DAI information by 2 and rounding down the dividing result; and the remaining coded modulation symbols are the coded modulation symbols of the DAI information carried in the second frequency hopping. Optionally, when the PDSCH performs the frequency hopping, the coded modulation symbols of the DAI information are mapped in the first frequency hopping firstly. When resources available in the first frequency hopping are insufficient, the remaining coded modulation symbols of the DAI are mapped in and transmitted in the second frequency hopping.

The method used to transmit DAI information in the above-mentioned embodiments may be used to transmit other downlink information, for example, DCI information. Now, for the higher reliability of the URLLC, a lot of resources are allocated to the DCI information, which results in serious congestion during transmission of the DCI in the PDCCH. If the DCI information or part of the DCI information is transmitted based on the method for transmitting DAI in the above-mentioned First and Second embodiments, then the transmission of DCI in the PDCCH will be reduced, thereby saving resources for transmitting DCI in the PDCCH, and avoiding or reducing PDCCH congestion.

In addition, if the number of bits of the transmitted DAI information is relatively small, the bits of the transmitted DAI information may be repeated or partially repeated according to the agreed rule (note that it is different from the repetition of the aforementioned repetition value). For example, it is repeated to M bits or more, and a value of M (which can be found in the protocol) is a number of threshold bits for whether to add the CRC. Then, the M bits are regarded as the data to be transmitted, and the processing is performed according to the DAI processing mechanisms in the First and Second embodiments.

The following specifically describes the numbering of DAI when the DCI+PDSCH mode and the SPS PDSCH mode are mixed.

When based on a dynamic HARQ-ACK codebook, and a UE has both PDSCH transmissions based on DCI scheduling and PDSCHs based on semi-persistent scheduling transmission, the base station should maintain the counting continuity between the counter DAI/total DAI of the DAI carried in the PDSCHs based on semi-persistent scheduling transmission and the counter DAI/total DAI of the DAI carried in the DCI. For example, in a group of PDSCHs scheduling by the DCI, one or more DL SPS PDSCH transmissions are interspersed. Then, if HARQ-ACKs of these PDSCHs are required to be fed back in one HARQ-ACK codebook, the UE uniformly determines a number of HARQ-ACK bits and positions of the HARQ-ACK bits according to the count of the DAI in the DCI and the DAI in the DL SPS PDSCHs, and then transmits them to the base station. The result will cause the HARQ-ACKs of the PDSCHs scheduled by the DCI and the HARQ-ACKs of the DL SPS PDSCHs to be crossed with each other. The base station side performs processing according to a reverse process, which will not be repeated herein.

Optionally, when based on the dynamic HARQ-ACK codebook, and the UE has both the PDSCH transmissions based on the DCI scheduling and the PDSCHs based on the semi-persistent scheduling transmission, the base station should respectively count the counter DAI/total DAI of the DAI carried in the PDSCHs based on semi-persistent scheduling transmission and the counter DAI/total DAI of the DAI carried in the DCI. For example, in the group of the PDSCHs scheduled by the DCI, one or more DL SPS PDSCH transmissions are interspersed. Then, if the HARQ-ACKs of these PDSCHs are required to be fed back in one HARQ-ACK codebook, according to the count of the DAI in the DCI and the count of the DAI in the DL SPS PDSCHs, the UE determines the HARQ-ACKs for the PDSCHs scheduled by the DCI and the HARQ-ACKs for the DL SPS PDSCHs respectively, then concatenates these HARQ-ACKs, in which the HARQ-ACKs of the PDSCHs scheduled by the DCI come first and the HARQ-ACKs of the DL SPS PDSCHs come after, and then transmits the concatenated HARQ-ACKs to the base station. In this case, the HARQ-ACKs of the PDSCHs scheduled by the DCI and the HARQ-ACKs of the DL SPS PDSCHs can be accurately distinguished. The base station side performs processing according to the reverse process, which will not be repeated herein.

Optionally, when based on the dynamic HARQ-ACK codebook, and the UE has both the PDSCH transmissions based on the DCI scheduling and the PDSCHs based on the semi-persistent scheduling transmission, the base station should not carry the DAI in the PDSCHs based on the semi-persistent scheduling transmission, but only carry the DAI in the DCI. For example, in the group of the PDSCHs scheduled by the DCI, one or more DL SPS PDSCH transmissions are interspersed. Then, if the HARQ-ACKs of these PDSCHs are required to be fed back in one HARQ-ACK codebook, the UE determines a number of the HARQ- ACKs for the PDSCHs scheduled by the DCI, according to the DAI in the DCI. For the DL SPS PDSCHs, a number of possible transmissions of the DL SPS PDSCHs in a time duration corresponding to the HARQ-ACK codebook is determined according to a periodic position, and a number of the HARQ-ACKs of the DL SPS PDSCHs is determined according to the number of the possible transmissions. Then their HARQ-ACKs are concatenated, in which the HARQ-ACKs of the PDSCHs scheduled by the DCI come first and the HARQ-ACKs of the DL SPS PDSCHs come after, and then the concatenated HARQ-ACKs are transmitted to the base station. In this case, the HARQ-ACKs of the PDSCHs scheduled by the DCI and the HARQ-ACKs of the DL SPS PDSCHs can be accurately distinguished. The base station side performs processing according to the reverse process, which will not be repeated herein.

Optionally, when based on the dynamic HARQ-ACK codebook, and the UE has both the PDSCH transmissions based on the DCI scheduling and the PDSCHs based on the semi-persistent scheduling transmission, the base station should not carry DAI in the PDSCHs based on the semi-persistent scheduling transmission, but only carry DAI in the DCI. For example, in the group of PDSCHs scheduled by the DCI, one or more DL SPS PDSCH transmissions are interspersed. Then, if the HARQ-ACKs of these PDSCHs are required to be fed back in one HARQ-ACK codebook, the UE determines the number of the HARQ-ACKs for the PDSCHs scheduled by the DCI, according to the DAI in the DCI. For the DL SPS PDSCHs, a number of possible transmissions of the DL SPS PDSCHs in the time duration corresponding to the HARQ-ACK codebook is determined, according to the periodic position and a detection result of the UE detecting whether the base station actually performs a transmission at the periodic position, and the number of the HARQ-ACKs of the DL SPS PDSCHs is determined according to the number of the possible transmissions. Then their HARQ-ACKs are concatenated, in which the HARQ-ACKs of the PDSCHs scheduled by the DCI come first and the HARQ-ACKs of the DL SPS PDSCHs come after, and then the concatenated HARQ-ACKs are transmitted to the base station. In this case, the HARQ-ACKs of the PDSCHs scheduled by the DCI and the HARQ-ACKs of the DL SPS PDSCHs can be accurately distinguished. The base station side performs processing according to the reverse process, which will not be repeated herein. Determining the number of the possible transmissions of the DL SPS PDSCHs in the time duration corresponding to the HARQ-ACK codebook, according to the periodic position and the detection result of the UE detecting whether the base station actually performs the transmission at the periodic position, may specifically be: it is supposed that the base station transmits a PDSCH at the DL SPS PDSCH periodic position, and then the UE tries to detect whether a DMRS corresponding to the PDSCH exists (there are many solutions to detect whether the DMRS exists, for example, energy detection); and when the DMRS exists, it is considered that the base station has performed the transmission at the periodic position, otherwise it is considered that the base station has not performed the transmission at the periodic position. Then the UE only generates a corresponding HARQ-ACK for the periodic position where the transmission is actually performed.

By adopting the above method, for a DL SPS PDSCH period in which the base station does not actually transmit a PDSCH, the UE may not perform HARQ-ACK feedback to reduce overhead. In the case of providing HARQ-ACK feedback for the DCI activation, the overhead of the feedback for the DCI activation is optimized, and in some cases, the overhead can be reduced.

Second Embodiment

Figure 6:
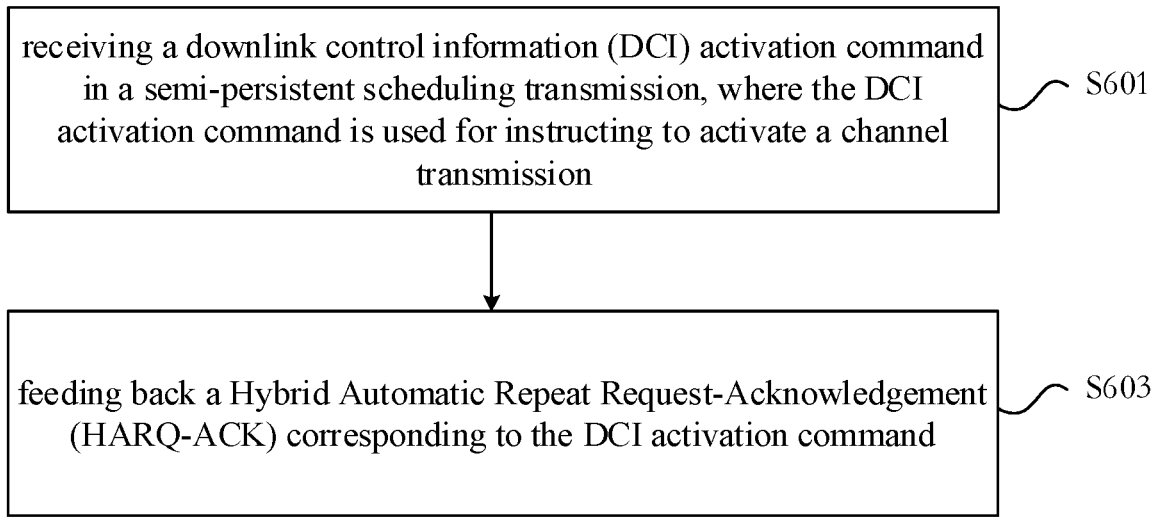
FIG. 6 is a flowchart of a method for feeding back acknowledgement information in an embodiment of the present disclosure.

The embodiments of the present disclosure provide a method for feeding back acknowledgement information. FIG. 6 is a flowchart of a method for feeding back acknowledgement information in an embodiment of the present disclosure. As shown in FIG. 6, the method includes the following steps.

In step S601, a DCI activation command is received in a semi-persistent scheduling transmission. The DCI activation command is used for instructing to activate a channel transmission.

In step S603, a HARQ-ACK corresponding to the DCI activation command is fed back.

Optionally, the above-mentioned step S603 may be implemented through the following steps: when a HARQ-ACK for DCI activation and a HARQ-ACK of a first PDSCH that is actually transmitted after a PDSCH based on semi-persistent scheduling transmission is activated are finally transmitted on a same PUCCH or a same PUSCH, an HARQ-ACK is generated only for the first PDSCH which is actually transmitted, and transmitted in the PUCCH or the PUSCH. If the HARQ-ACK for the DCI activation and the HARQ-ACK of the first PDSCH that is actually transmitted correspond to respective PUCCHs or PUSCHs, they are respectively transmitted in the respective PUCCHs or PUSCHs. If a base station and a UE agree on that the HARQ-ACK for the DCI activation and the HARQ-ACK of the first PDSCH that is actually transmitted correspond to respective PUCCHs, and their respective PUCCHs overlap in full or partially with each other in a time domain, and then their respective PUCCHs are combined into one PUCCH. At this time, it is considered that they are finally transmitted in the same PUCCH.

In this embodiment, a device for feeding back acknowledgement information is further provided, and the device is used to implement the above-mentioned embodiments and optional implementations, and those that have been described will not be repeated. As used below, the term "module" is a combination of software and/or hardware that can implement predetermined functions. Although the devices described in the following embodiments is preferably implemented by software, implementation by hardware or a combination of software and hardware is also possible and conceived.

Figure 7:
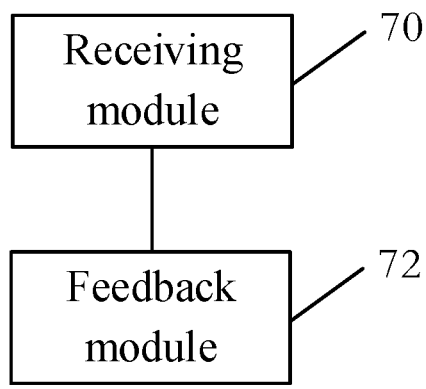
FIG. 7 is a structural block diagram of a device for feeding back acknowledgement information according to an embodiment of the present disclosure.

FIG. 7 is a structural block diagram of a device for feeding back acknowledgement information according to an embodiment of the present disclosure. As shown in FIG. 7, the device includes the followings.

A receiving module 70 is configured to receive a DCI activation command in a semi-persistent scheduling transmission. The DCI activation command is used for instructing to activate a channel transmission.

A feedback module 72 is configured to feedback an HARQ-ACK corresponding to the DCI activation command.

Figure 8:
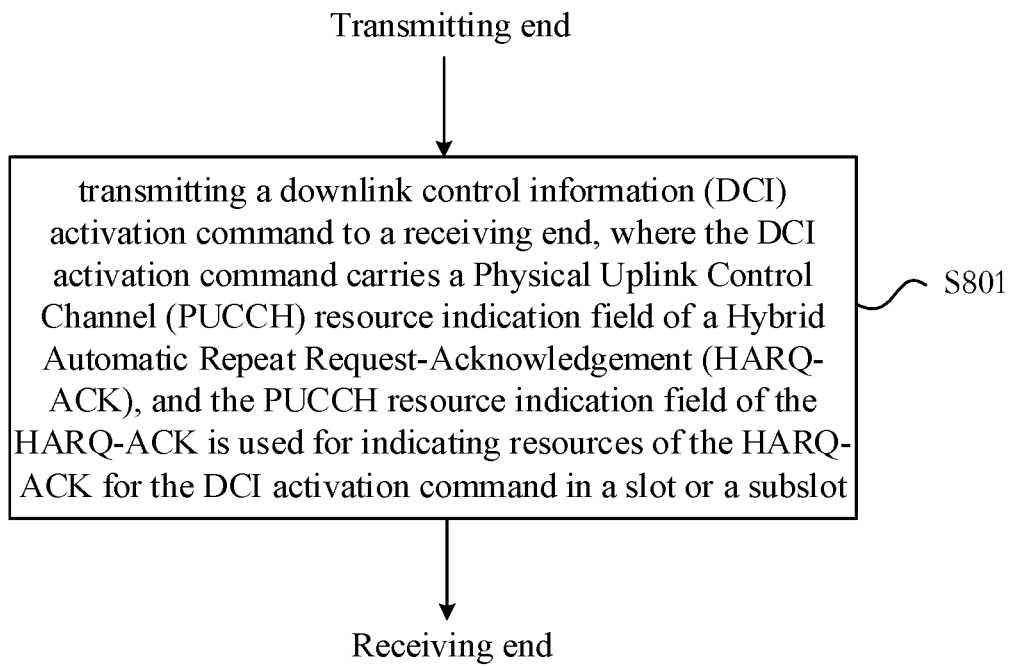
FIG. 8 is another flowchart of a method for feeding back acknowledgement information in an embodiment of the present disclosure.

According to another embodiment of the present disclosure, a method for feeding back acknowledgement information is further provided. FIG. 8 is another flowchart of a method for feeding back acknowledgement information in an embodiment of the present disclosure. As shown in FIG. 8, the method incudes the followings.

In step S801, a DCI activation command is sent to a receiving end. The DCI activation command carries a PUCCH resource indication field of an HARQ-ACK, and the PUCCH resource indication field of the HARQ-ACK is used for indicating resources of the HARQ-ACK for the DCI activation command in a slot or a subslot.

In an embodiment, the method further includes: setting a slot/subslot position of the HARQ-ACK corresponding to the DCI activation by using at least one of the following methods: agreeing on that the slot/subslot position is a slot or a subslot where the DCI activation is carried; agreeing on that the slot/subslot position is a N-th uplink slot/subslot after a slot or a subslot where the DCI activation is carried, and N is one of 1, 2 or 3; indicating the slot/subslot position of the HARQ-ACK for the DCI activation by using a CCE index of the DCI activation command, specifically: a minimum CCE index is multiplied by P and then divided by num, and an obtained value is rounded down to obtain a value Q; where num is a number of CCEs in a configured control information resource set of the UE, and P is a number of possible slot/subslot positions corresponding to the HARQ-ACK. The value Q represents one slot or one subslot corresponding to the HARQ-ACK; and according to the position of the DCI activation in the slot/subslot, if the DCI activation is located in a first half of the slot/subslot, then it is agreed on that the slot/subslot that activates the DCI is the current slot or subslot; and if the DCI activation is located in a last half of the slot/subslot, then it is agreed on that the slot/subslot that activates the DCI is a next slot/subslot.

The present application further includes the following manner: the PUCCH resource indication field in the DCI activation is reinterpreted to indicate a slot/subslot position where the PUCCH of the HARQ-ACK for the DCI activation is located. At this time, the PUCCH resource of the HARQ-ACK is configured and uniquely determined through high-layer signaling, or the PUCCH resource of the HARQ-ACK is acquired in an agreed manner, so as to avoid using the PUCCH resource indicator field for further instructions.

In this embodiment, a device for feeding back acknowledgement information is further provided, and the device is used to implement the above-mentioned embodiments and optional implementations, and those that have been described will not be repeated. As used below, the term "module" is a combination of software and/or hardware that can implement predetermined functions. Although the devices described in the following embodiments are preferably implemented by software, implementation by hardware or a combination of software and hardware is also possible and conceived.

Figure 9:
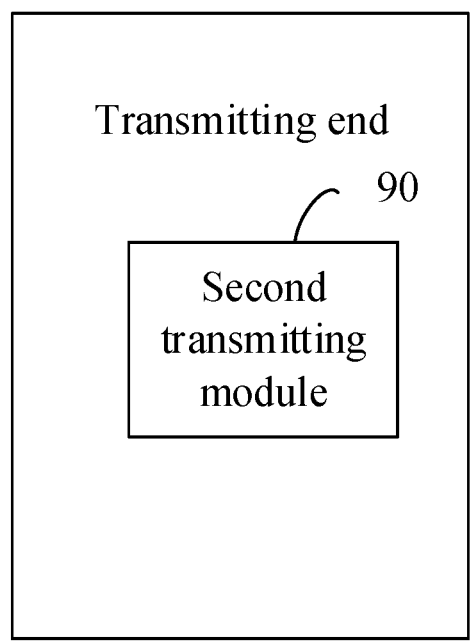
FIG. 9 is a structural block diagram of a device for feeding back acknowledgement information according to an embodiment of the present disclosure.

FIG. 9 is a structural block diagram of a device for feeding back acknowledgement information according to an embodiment of the present disclosure. As shown in FIG. 9, the device includes the followings.

A second transmitting module 90 is configured to transmit a DCI activation command to a receiving end. The DCI activation carries a PUCCH resource indication field of an HARQ-ACK, and the PUCCH resource indication field of the HARQ-ACK is used for indicating resources of the HARQ-ACK for the DCI activation in a slot or a subslot.

In order to better understand the technical solutions in the above-mentioned embodiments, the embodiments of the present disclosure describe specific implementations of the above-mentioned solutions through the following examples.

The problem solved by this embodiment is that under a DL SPS PDSCH mechanism, there is no HARQ-ACK corresponding to the DCI activation currently, which may cause serious problems in a URLLC service (which requires very small transmission latency). For example, when a base station activates a DL SPS PDSCH for a UE in advance, the base station sends a DCI activation to the UE, but the UE does not actually receive the DCI activation. However, the base station thinks that the UE has received the DCI activation, and when there is an actual URLLC service to be transmitted, the base station directly sends data at a DL SPS PDSCH period, but the UE does not receive and feedback an HARQ-ACK, which easily causes the URLLC transmission to be delayed. In a mechanism of the related art, since there is no URLLC service and ordinary services are not sensitive to the latency, for ordinary services, even if the above situation occurs, the base station will send the DCI activation again until the UE receives the DCI activation, and then retransmit the service data. Obviously, this mechanism is not suitable for the URLLC service.

It is also necessary to perform HARQ-ACK feedback for the DCI activation. However, in the mechanism of related art, the DCI activation does not have its own resources for the HARQ-ACK feedback. A solution mechanism is proposed below to improve the HARQ-ACK feedback for the DCI activation.

First, the base station and the UE agree on that at the DL SPS PDSCH period, if the base station does not actually perform the transmission, the UE does not feedback an HARQ-ACK corresponding to the DL SPS PDSCH.

The base station and the UE agree on that if an HARQ-ACK for the DCI activation and an HARQ-ACK of a first PDSCH that is actually transmitted after the DL SPS PDSCH is activated are finally transmitted on a same PUCCH or PUSCH, then the UE does not generate the HARQ-ACK for the DCI activation, and generates the HARQ-ACK for the first PDSCH that is actually transmitted, and transmits it on the PUCCH/PUSCH; and the base station receives the HARQ-ACK fed back by the UE, considers that the HARQ-ACK is for the DL SPS PDSCH, and considers that the DCI activation is correctly received. If the HARQ-ACK for the DCI activation and the HARQ-ACK of the first PDSCH that is actually transmitted after the DL SPS PDSCH is activated are finally transmitted on different PUCCHs/PUSCHs, the UE generates HARQ-ACKs for the DCI activation and the first PDSCH that is actually transmitted respectively, and transmits the HARQ-ACKs respectively. The base station and the UE agree on that if the HARQ-ACK for the DCI activation and the HARQ-ACK of the first PDSCH that is actually transmitted correspond to respective PUCCHs, but the respective PUCCHs overlap with each other in time domain in whole or in part, the respective PUCCHs will be merged into one new PUCCH (which may be a PUCCH of the HARQ-ACK of the first PDSCH that is actually transmitted). At this time, it is considered that they are finally transmitted in the same PUCCH.

The above scheme may also have equivalent descriptions. For example, the base station and the UE agree on that if the DCI activation and its corresponding first DL SPS PDSCH that is actually transmitted are in the same slot or subslot, or the HARQ-ACK for the DCI activation and the HARQ-ACK of the corresponding first DL SPS PDSCH that is actually transmitted are fed back in the same slot or subslot, the UE does not generate the HARQ-ACK for the DCI activation, generates the HARQ-ACK for the first DL SPS PDSCH that is actually transmitted, and transmits the HARQ-ACK in a HARQ-ACK resource corresponding to the first DL SPS PDSCH that is actually transmitted; otherwise, the UE respectively generates the HARQ-ACKs for the DCI activation and the first DL SPS PDSCH that is actually transmitted, and transmits the HARQ-ACKs in their respective resources.

In addition, in a DL SPS PDSCH mechanism of the related art, a resource in a slot/subslot of a HARQ-ACK corresponding to a DL SPS PDSCH is configured by an RRC message. Specifically, the slot/subslot in which the resource is located is indicated by an HARQ-ACK feedback timing indicator field in the DCI activation, and is only used for transmitting one HARQ-ACK corresponding to the DL SPS PDSCH. There is no need for the DCI to indicate the location of the HARQ-ACK resource. In the mechanism of related art, since there is no corresponding HARQ-ACK feedback for the DCI activation, the HARQ-ACK for the DCI activation does not have a corresponding HARQ-ACK resource. In this embodiment, the HARQ-ACK resource for the DCI activation may be determined in the following manners.

Determining the HARQ-ACK resource corresponding to the DCI activation includes: the base station and the UE agree on that the PUCCH resource indicator field of the HARQ-ACK carried in the DCI is used for indicating a resource in the slot/subslot of the HARQ-ACK for the DCI activation. One of the following methods is used to determine the slot/subslot position of the HARQ-ACK corresponding to the DCI activation.

1) It is agreed on that the slot/subslot is a slot or a subslot where the DCI activation is carried.

2) It is agreed on that the slot/subslot is a N-th uplink slot/subslot after the slot or the subslot where the DCI activation is carried, and N is one of 1, 2 or 3.

3) A CCE index of the DCI activation implicitly indicates the slot/subslot of the HARQ-ACK for the DCI activation. Specifically, a minimum CCE index is multiplied by P and then divided by num, and an obtained value is rounded down to obtain a value Q; where num is a number of CCEs in a configured control information resource set of the UE, and P is a number of possible slot/subslot positions corresponding to the HARQ-ACK. A value of Q will be got, and the value of Q is used for indicating one slot/subslot corresponding to the HARQ-ACK. For example, a number of possible slots/subslots between the HARQ-ACK for the DCI activation and the DCI activation is 0 or 1, which corresponds to an interval set {0,1}, 0 means that the HARQ-ACK is in the current slot/subslot, and 1 means that the HARQ-ACK is in the next slot/subslot of the slot/subslot where the DCI activation is located. At this time, since there are two possible slot/subslot positions (respectively corresponding to the interval values of 0 and 1), P=2. It is assumed that the number of CCEs in the control information resource set is 4, and num=4. Then, the minimum CCE index of the DCI activation is 2, and the value of Q is calculated as 1. In fact, at this time, according to different CCE indexes, the value of Q may be obtained as 0 or 1. At this time, it can be agreed on that that the value 0 of Q corresponds to the first interval value in the above-mentioned interval set, and that the value 1 of Q corresponds to the second interval value in the above-mentioned interval set. The base station is able to change the interval value according to the minimum CCE for sending the DCI activation.

4) According to a position of the DCI activation in the slot/subslot, if the DCI activation is located in the first half of the slot or subslot (according to a position of an end symbol), it is agreed on that a slot or subslot of the HARQ-ACK corresponding to the DCI activation is the slot or subslot where the DCI activation is located; and if the DCI activation is in the last half of the slot/subslot (according to the position of the end symbol), it is agreed on that the slot or subslot of the HARQ-ACK corresponding to the DCI activation is a next slot/subslot of the slot or subslot where the DCI activation is located.

5) The PUCCH resource indication field in the DCI activation is reinterpreted to indicate the slot/subslot position where the PUCCH of the HARQ-ACK for the DCI activation is located. At this time, the PUCCH resource of HARQ-ACK is configured and uniquely determined through high-layer signaling, or the PUCCH resource of HARQ-ACK is acquired in an agreed manner, so as to avoid using the PUCCH resource indicator field for further instructions.

The HARQ-ACK resource for the DCI activation may be determined independently, without considering saving the HARQ-ACK overhead of the DCI activation, and the above-mentioned methods may also be considered to save the HARQ-ACK overhead of the DCI activation.

Third Embodiment

In this embodiment, a configuration strategy for DL SPS transmission is provided, so that the DL SPS transmission has a certain degree of flexibility, such as an ability of adjusting modulating and encoding modes according to channel conditions. In a mechanism of related art, when a base station configures parameters of the DL SPS transmission for a UE through RRC, only one modulating and encoding mode can be configured; that is, regardless of a channel quality, the base station can only use this modulating and encoding mode, which causes the modulating and encoding mode to fail to follow changes in the channel quality, resulting in low transmission efficiency.

In this embodiment, the base station and the UE agree on that when the base station configures the parameters of the DL SPS transmission for the UE through RRC, the base station configures multiple sets of parameters of the modulating and encoding modes for the UE. When transmitting DL SPS data, the base station is able to determine to use one of the multiple sets according to the channel quality for performing the DL SPS transmission. When receiving the DL SPS data, the UE performs detection according to the configured multiple sets of the modulating and encoding modes.

Although this increases a complexity of detection and reception of the UE, it is also a feasible working mechanism.

In order to further reduce the complexity of the detection and the reception of the UE, the following improvements may be made.

The base station and the UE agree on that when the base station configures the parameters of the DL SPS through the RRC, the base station configures multiple sets of the parameters of the modulating and encoding modes for the UE, and agree on or configure that a DMRS pattern or sequence corresponds to each modulating and encoding mode. When transmitting DL SPS data, the base station selects a certain set of modulating and encoding mode and uses a corresponding DMRS pattern or sequence at the same time. In this way, the UE first detects the DMRS pattern or sequence, then determines the corresponding modulating and encoding strategy MCS based on the obtained DMRS pattern or sequence, and then decodes the PDSCH, thereby avoiding detecting and receiving the PDSCH by trying the multiple sets of modulating and encoding modes, and reducing the complexity of the detection and the reception (the complexity of detecting the DMRS pattern or sequence is much less than that of detecting and receiving the PDSCH by trying the multiple sets of modulating and encoding modes).

For example, three sets of modulating and encoding schemes are configured for the UE, and then three corresponding DMRS sequences are configured for the UE. It may also be that the three sets of modulating and encoding schemes respectively correspond to different cyclic shifts of one DMRS sequence.

For another example, the three sets of modulating and encoding schemes are configured for the UE, and then two corresponding DMRS patterns are configured for the UE. For example, the three sets of modulating and encoding schemes respectively correspond to different RE offsets (relative to an RB boundary) when the DMRS is mapped in the frequency domain.

In order to further reduce the complexity of the detection and the reception of the UE, the following improvements may be made.

When activating a DL SPS PDSCH, configuring multiple sets of MCS parameters are indicated through the DCI activation, and the DL SPS PDSCH is activated this time by using one set of MCS parameters. Then the UE receives the DL SPS PDSCH according to the MCS provided in the DCI activation.

By adopting the above method, the base station can determine a corresponding MCS according to a channel change, so that the matching of the MCS can be improved as much as possible according to the channel condition.

Fourth Embodiment

In a protocol of the related art, when multiple PUCCHs overlap in a time domain, a PUCCH merging mechanism will be adopted. Based on the merging mechanism, a final PUCCH (which may be a new one or one of the multiple PUCCHs) will be generated. UCI in the multiple PUCCHs will be transmitted in the final PUCCH, and the remaining PUCCHs are discarded. In addition, if the final PUCCH overlaps with one PUSCH in the time domain, the UCI in the final PUCCH is transmitted in the PUSCH, and the final PUCCH is discarded.

In addition, in the protocol of the related art, when the UCI is transmitted in the PUCCH, the UCI is transmitted in the PUCCH according to a maximum bit rate, and a discarding rule will be used in a case the transmission of the UCI cannot be carried. For the discarding rule, reference may be made to section 9.2.5.2 of the protocol 38.213 (for the convenience of description later, which is recorded as a discarding rule 1). The basic principle can be summarized as that: it is calculated whether all HARQ-ACK/SR+CSI (including CSI-1 and CSI-2)+CRC can be carried according to the maximum code rate; if not, the discarding rule is executed until the UCI satisfies a requirement for the transmission in the PUCCH and the maximum code rate, and otherwise, continue to discard until only the HARQ-ACK/SR remains; and at this time, regardless of the code rate, all HARQ-ACK/SRs is sent in the PUCCH resource. In addition, in the protocol of the related art, when the UCI is transmitted in the PUSCH, and a resource of CSI-2 (CSI part 2) in the PUSCH is not enough to transmit the CSI-2, e.g., when the CSI-2 is carried in the PUSCH according to a configured code rate and a calculated resource for carrying CSI-2 is not enough to map CSI-2, part of information in the CSI-2 is discarded according to a discarding rule (for the convenience of description later, which is recorded as a discarding rule 2), for which reference may be made to section 5.2.3 of the protocol 38.214, until the bit rate of the CSI-2 is less than a threshold, and the threshold is defined in the protocol. The above two discarding rules are obviously different. According to the former, all CSI information may be discarded at most; and according to the latter, only the CSI-2 is able to be discarded at most. The reason is that a general PUSCH resource is relatively large, so the discarded ones can be as few as possible.

Therefore, by analyzing the protocols of related art, it is found that there will be problems of ambiguous in the following situations, that is, there are new problems that need to be resolved, otherwise understandings of the base station and the UE will be inconsistent, and ultimately the UCI information cannot be decoded correctly.

For example, when the multiple PUCCHs overlap in one slot/subslot in the time domain, according to the rules of related art, the multiple PUCCHs are merged, the final PUCCH is obtained by the merging the multiple PUCCHs, and the UCI in the multiple PUCCHs is multiplexed in the final PUCCH. However, if there is a lot of UCI information, and it cannot be carried according to a configured bit rate, what should to be done? Obviously, if the final PUCCH no longer overlaps with the PUSCH in the time domain, then the discarding rule will be adopted during the transmission of the UCI. However, if the final PUCCH also overlaps with the PUSCH in the time domain, according to the protocol rules, the UCI in the final PUCCH needs to be carried in the PUSCH at this time, and the final PUCCH is discarded. The general PUSCH resource is relatively large. At this point, in view of the above analysis, for carrying the UCI in the final PUCCH, the following methods are given in the present application.

Method 1: For the UE, the multiple PUCCHs overlap in one slot/subslot in the time domain, the UCI of these PUCCHs will be multiplexed in a final PUCCH, and the remaining PUCCHs are discarded (for the acquisition of the final PUCCH, reference may be made to section 9.2.5 of the existing protocol 38.213). If the final PUCCH still overlaps with the PUSCH in the time domain, the UCI carried in the final PUCCH is multiplexed in the PUSCH. In this process, when the UCI from the multiple PUCCHs is carried in the final PUCCH (regardless of whether the UCI can be carried by the final PUCCH), the discarding rule 1 is not executed; and when the UCI is carried in the PUSCH, if there are not enough resources in the PUSCH to carry the UCI, the discarding rule 2 is executed. The base station and the UE agree on that the UE obtains the final PUCCH after processing the multiplexing between the multiple PUCCHs that overlap in the time domain, and then processes the overlap of the final PUCCH and the PUSCH; and in the whole process, the UCI discarding rule is used only when the UCI is multiplexed into the PUCCH/PUSCH to be finally transmitted. That is, the base station and the UE agree on that before the UCI is multiplexed into the PUCCH/PUSCH channel that ultimately carries the UCI, the UCI discarding rule is forbidden to be used. The discarding rule refers to discarding part of the UCI information when the PUCCH or PUSCH carrying the UCI does not have enough resources to carry the UCI. The UCI herein is a sum of UCI from the multiple PUCCHs, and also includes the UCI (if any) that is planned to be carried in the PUSCH.

In this way, integrity of the UCI can be guaranteed to the greatest extent, because PUSCH resources are generally sufficient, and the use of the discarding rule 2 can reduce the discarding of UCI information.

Method 2: When the final PUCCH and the PUSCH overlaps in the time domain, and the UCI from the multiple PUCCHs cannot be carried by the final PUCCH, the discarding rule 1 is executed. Then, when new UCI (which refers to UCI obtained after the discarding rule 1 is executed) is carried on the PUSCH, if there are not enough resources in the PUSCH to carry the UCI, the discarding rule 2 is executed.

Fifth Embodiment

The embodiments of the present application further provide a storage medium, and a computer program is stored in the storage medium. The computer program is configured to, when being executed, perform the steps in any one of the above-mentioned method embodiments.

Optionally, in this embodiment, the above-mentioned storage medium may be configured to store a computer program for performing the following step.

In step S1, a physical shared channel carrying index information is transmitted to a receiving end, and the index information is used for instructing the receiving end to count a number of the transmitting of the physical shared channel.

Optionally, in this embodiment, the above-mentioned storage medium may be configured to store a computer program for performing the following step of: transmitting a PDSCH carrying DAI information to the receiving end. The DAI information includes counter DAI information and/or total DAI information. The counter DAI information is used for indicating a number of PDSCHs that have been transmitted by a transmitting end in a carrier of the receiving end until the currently transmitted PDSCH. The total DAI information is used for indicating a sum of a number of PDSCHs that have been transmitted by the transmitting end in the carrier of the receiving end until the current transmission opportunity and a number of PDSCHs queued to be transmitted at the current transmission opportunity.

Optionally, in this embodiment, the above-mentioned storage medium may be configured to store a computer program for performing the following steps of: sequentially repeating, encoding and modulating the DAI information to obtain coded modulation symbols of the DAI information; and transmitting the obtained coded modulation symbols of the DAI information by using all or part of REs in a physical resource block of the PDSCH.

Optionally, in this embodiment, the above-mentioned storage medium may be configured to store a computer program for performing the following steps of: repeating the DAI according to a pre-configured repetition value, and the repetition value being determined by at least one of being instructed by a physical layer, being configured by higher-layer signaling, or agreeing on a default value in advance; encoding the DAI information including: encoding the DAI information according to a pre-configured encoding mode, and the encoding mode of the DAI information being determined by at least one of being determined to be same as an encoding mode of the PDSCH carrying the DAI information, being determined to be different from the encoding mode of the PDSCH carrying the DAI information, or agreeing on the encoding mode in advance; and modulating the DAI information including: modulating the DAI information according to a pre-configured modulation mode, and the modulation mode of the DAI information being determined by at least one of being determined to be same as a modulation mode of the PDSCH carrying the DAI information, and agreeing on the modulation mode in advance.

Optionally, in this embodiment, the above-mentioned storage medium may be configured to store a computer program for performing the following step of: configuring a repetition value for the DAI information by at least one of the following methods: configuring the repetition value for the DAI information in a RRC message used for configuring a downlink semi-persistent transmission parameter; and configuring the repetition value for the DAI information in DCI used for activating a downlink semi-persistent transmission.

Optionally, in this embodiment, the above-mentioned storage medium may be configured to store a computer program for performing the following steps of: configuring a set of repetition values by using the RRC message, and selecting a value from the set of repetition values to for configuring the repetition value; or configuring the repetition value through the DCI.

Optionally, in this embodiment, the above-mentioned storage medium may be configured to store a computer program for performing the following step of: determining a number of REs used to transmit the coded modulation symbols according to the following equation:

$$R_{DAI} = \min\left\{\left\lceil \frac{(D+L) \cdot r \cdot RE_1}{\text{Data}} \right\rceil, \lceil A \cdot RE_1 \rceil\right\}.$$

$R_{DAI}$ represents the number of the REs used by the coded modulation symbols of the DAI information; D represents a number of bits of the DAI information; L represents a number of check bits of CRC, and in a case where the number of bits of the DAI information is less than or equal to 11, L=0; $RE_1$ represents all RE resources able to be used for transmitting the PDSCH or able to be used for transmitting the DAI information, in the physical resource block allocated to the receiving end of a UE for transmitting the PDSCH; Data represents a number of data bits actually transmitted by the PDSCH; A is a coefficient and configured by the transmitting end; and r is a repetition value of the DAI information.

Optionally, in this embodiment, the above-mentioned storage medium may be configured to store a computer program for performing the following step of: determining an OFDM symbol used in the physical resource block of the PDSCH for the coded modulation symbols of the DAI information. The used OFDM symbol includes: an OFDM symbol immediately adjacent to an OFDM symbol of a reference signal in the physical resource block allocated for the PDSCH, and/or the OFDM symbol of the reference signal.

Optionally, in this embodiment, the above-mentioned storage medium may be configured to store a computer program for performing the following step of: mapping the coded modulation symbols of the DAI information on the OFDM symbol used in the physical resource block of the PDSCH, according to a preset first mapping rule. The first mapping rule includes: first mapping on REs that are not occupied by the reference signal in the OFDM symbol where the reference signal is located, and then mapping on REs in the symbol immediately adjacent to the reference signal; or mapping only on the REs in the symbol immediately adjacent to the reference signal.

Optionally, in this embodiment, the above-mentioned storage medium may be configured to store a computer program for performing the following step of: mapping the coded modulation symbols of the DAI information on the OFDM symbol used in the physical resource block of the PDSCH, according to a preset second mapping rule. The second mapping rule includes: performing the mapping on a first symbol of the PDSCH according to a discrete RE pattern, in a case where half of REs of the first symbol are not able to be full filled by remaining coded modulation symbols corresponding to the DAI information during the mapping. A discrete RE interval is a value obtained by: dividing a number of the REs of the physical resource block of the PDSCH in the first symbol by a number of the remaining coded modulation symbols corresponding to the DAI information to obtain a result, and rounding the result up or down.

Optionally, in this embodiment, the above-mentioned storage medium may be configured to store a computer program for performing the following step that: when the DAI information includes both the counter DAI information and the total DAI information, one of following operations is performed: respectively calculating a number of RE resources or coded modulation symbols to be used by the counter DAI information and a number of RE resources or coded modulation symbols to be used by the total DAI information, and encoding and modulating the counter DAI information and the total DAI information respectively; or taking the counter DAI information and the total DAI information as a whole, calculating a number of RE resources or coded modulation symbols to be used by the counter DAI information and the total DAI information as the whole, and encoding and modulating the counter DAI information and the total DAI information as the whole.

Optionally, in this embodiment, the above-mentioned storage medium may be configured to store a computer program for performing the following steps of: when the PDSCH performs frequency hopping in a frequency-domain, dividing the coded modulation symbols of the DAI information into two parts, and mapping and transmitting the two parts respectively in a first frequency hopping and a second frequency hopping. A number of coded modulation symbols of the DAI information carried in the first frequency hopping is obtained by dividing a number of the total coded modulation symbols of the DAI information by 2 and rounding down the dividing result. The other coded modulation symbols are carried in the second frequency hopping.

Optionally, in this embodiment, the above-mentioned storage medium may be configured to store a computer program for performing the following steps of: when the PDSCH performs frequency hopping in a frequency-domain, mapping the coded modulation symbols of the DAI information in a first frequency hopping, and when resources available in the first frequency hopping are insufficient, mapping and transmitting remaining coded modulation symbols of the DAI information in a second frequency hopping.

Optionally, in this embodiment, the above-mentioned storage medium may be configured to store a computer program for performing the following step of: while transmitting the PDSCH based on semi-persistent scheduling to the receiving end, transmitting a first PDSCH based on DCI scheduling also. A serial number of the DAI in the PDSCH based on the semi-persistent scheduling and a serial number of the DAI in the first PDSCH are consecutive.

Optionally, in this embodiment, the above-mentioned storage medium may be configured to store a computer program for performing the following steps that: when the PDSCH based on the semi-persistent scheduling and the first PDSCH based on the DCI scheduling are transmitted to the receiving end simultaneously, the serial number of the DAI in the first PDSCH includes a number of PDSCHs based on the semi-persistent scheduling, and the PDSCHs based on the semi-persistent scheduling do not include the DAI information. The PDSCHs based on the semi-persistent scheduling that do not include the DAI information are not consecutive to greater than M, and M is an integer greater than zero.

Optionally, in this embodiment, the above-mentioned storage medium may be configured to store a computer program for performing the following step of: transmitting a PUSCH carrying UAI information to the receiving end. The UAI information includes counter UAI information and/or total UAI information. The counter UAI information is used for indicating a number of PUSCHs that have been transmitted by a transmitting end in a configured carrier until a currently transmitted PUSCH. The total UAI information is used for indicating a sum of a number of PUSCHs that have been transmitted by the transmitting end in the carrier configured at the receiving end until a current transmission opportunity and a number of PUSCHs queued to be transmitted at the current transmission opportunity.

Optionally, in this embodiment, the above-mentioned storage medium may be configured to store a computer program for performing the following step.

In step S11, a DCI activation command is received in a semi-persistent scheduling transmission, and the DCI activation command is used for instructing to activate a channel transmission; and a HARQ-ACK corresponding to the DCI activation command is fed back.

Optionally, in this embodiment, the above-mentioned storage medium may be configured to store a computer program for performing the following step.

In step S21, a DCI activation command is sent to a receiving end. The DCI activation command carries a PUCCH resource indication field of an HARQ-ACK, and the PUCCH resource indication field of the HARQ-ACK is used for indicating resources of the HARQ-ACK for the DCI activation command in a slot or a subslot.

Optionally, in this embodiment, the above-mentioned storage medium may include, but is not limited to various media that can store computer programs, such as a U disk, a Read-Only Memory (ROM), a Random Access Memory (RAM), a mobile hard drive, a magnetic disk, or an optical disk.

The embodiments of the present disclosure further provide an electronic device, including a memory and a processor, the memory is stored a computer program, and the processor is configured to execute the computer program to perform the steps in any one of the above-mentioned method embodiments.

Optionally, the above-mentioned electronic device may further include a transmission device and an input/output device. The transmission device is connected to the above-mentioned processor, and the input/output device is connected to the above-mentioned processor.

Optionally, in this embodiment, the above-mentioned processor may be configured to perform the following step through the computer program.

In step S1, a physical shared channel carrying index information is transmitted to a receiving end, and the index information is used for instructing the receiving end to count a number of the transmitting of the physical shared channel.

Optionally, in this embodiment, the above-mentioned processor may be configured to perform the following step through the computer program: transmitting a PDSCH carrying DAI information to the receiving end. The DAI information includes counter DAI information and/or total DAI information. The counter DAI information is used for indicating a number of PDSCHs that have been transmitted by a transmitting end in a carrier of the receiving end until the currently transmitted PDSCH. The total DAI information is used for indicating a sum of a number of PDSCHs that have been transmitted by the transmitting end in the carrier of the receiving end until the current transmission opportunity and a number of PDSCHs queued to be transmitted at the current transmission opportunity.

Optionally, in this embodiment, the above-mentioned processor may be configured to perform the following steps through the computer program: sequentially repeating, encoding and modulating the DAI information to obtain coded modulation symbols of the DAI information; and transmitting the obtained coded modulation symbols of the DAI information by using all or part of REs in a physical resource block of the PDSCH.

Optionally, in this embodiment, the above-mentioned processor may be configured to perform the following steps through the computer program: repeating the DAI according to a pre-configured repetition value, and the repetition value being determined by at least one of being instructed by a physical layer, being configured by higher-layer signaling, or agreeing on a default value in advance; encoding the DAI information including: encoding the DAI information according to a pre-configured encoding mode, and the encoding mode of the DAI information being determined by at least one of being determined to be same as an encoding mode of the PDSCH carrying the DAI information, being determined to be different from the encoding mode of the PDSCH carrying the DAI information, or agreeing on the encoding mode in advance; and modulating the DAI information including: modulating the DAI information according to a pre-configured modulation mode, and the modulation mode of the DAI information being determined by at least one of being determined to be same as a modulation mode of the PDSCH carrying the DAI information, and agreeing on the modulation mode in advance.

Optionally, in this embodiment, the above-mentioned processor may be configured to perform the following step through the computer program: configuring a repetition value for the DAI information by at least one of the following methods: configuring the repetition value for the DAI information in a RRC message used for configuring a downlink semi-persistent transmission parameter; and configuring the repetition value for the DAI information in DCI used for activating a downlink semi-persistent transmission.

Optionally, in this embodiment, the above-mentioned processor may be configured to perform the following steps through the computer program: configuring a set of repetition values by using the RRC message, and selecting a value from the set of repetition values for configuring the repetition value; or configuring the repetition value through the DCI.

Optionally, in this embodiment, the above-mentioned processor may be configured to perform the following step through the computer program: determining a number of REs used to transmit the coded modulation symbols according to the following equation:

$$R_{DAI} = \min\left\{\left\lceil \frac{(D+L) \cdot r \cdot RE_1}{Data} \right\rceil, \lceil A \cdot RE_1 \rceil\right\}.$$

$R_{DAI}$ represents the number of the REs used by the coded modulation symbols of the DAI information; D represents a number of bits of the DAI information; L represents a number of check bits of CRC, and in a case of the number where bits of the DAI information is less than or equal to 11, L=0; $RE_1$ represents all RE resources able to be used for transmitting the PDSCH or able to be used for transmitting the DAI information, in the physical resource block allocated to the receiving end of a UE for transmitting the PDSCH; Data represents a number of data bits actually transmitted by the PDSCH; A is a coefficient and configured by the transmitting end; and r is a repetition value of the DAI information.

Optionally, in this embodiment, the above-mentioned processor may be configured to perform the following step through the computer program: determining an OFDM symbol used in the physical resource block of the PDSCH for the coded modulation symbols of the DAI information. The used OFDM symbol includes: an OFDM symbol immediately adjacent to an OFDM symbol of a reference signal in the physical resource block allocated for the PDSCH, and/or the OFDM symbol of the reference signal.

Optionally, in this embodiment, the above-mentioned processor may be configured to perform the following step through the computer program: mapping the coded modulation symbols of the DAI information on the OFDM symbol used in the physical resource block of the PDSCH, according to a preset first mapping rule. The first mapping rule includes: first mapping on REs that are not occupied by the reference signal in the OFDM symbol where the reference signal is located, and then mapping on REs in the symbol immediately adjacent to the reference signal; or mapping only on the REs in the symbol immediately adjacent to the reference signal.

Optionally, in this embodiment, the above-mentioned processor may be configured to perform the following step through the computer program: mapping the coded modulation symbols of the DAI information on the OFDM symbol used in the physical resource block of the PDSCH, according to a preset second mapping rule. The second mapping rule includes:

performing the mapping on a first symbol of the PDSCH according to a discrete RE pattern, in a case where half of REs of the first symbol are not able to be full filled by remaining coded modulation symbols corresponding to the DAI information during the mapping. A discrete RE interval is a value obtained by: dividing a number of the REs of the physical resource block of the PDSCH in the first symbol by a number of the remaining coded modulation symbols corresponding to the DAI information to obtain a result, and rounding the result up or down.

Optionally, in this embodiment, the above-mentioned processor may be configured to, through the computer program, perform the following step that: when the DAI information includes both the counter DAI information and the total DAI information, one of following operations is performed: respectively calculating a number of RE resources or coded modulation symbols to be used by the counter DAI information and a number of RE resources or coded modulation symbols to be used by the total DAI information, and encoding and modulating the counter DAI information and the total DAI information respectively; or taking the counter DAI information and the total DAI information as a whole, calculating a number of RE resources or coded modulation symbols to be used by the counter DAI information and the total DAI information as the whole, and encoding and modulating the counter DAI information and the total DAI information as the whole.

Optionally, in this embodiment, the above-mentioned processor may be configured to perform the following steps through the computer program: when the PDSCH performs frequency hopping in a frequency-domain, dividing the coded modulation symbols of the DAI information into two parts, and mapping and transmitting the two parts respectively in a first frequency hopping and a second frequency hopping. A number of coded modulation symbols of the DAI information carried in the first frequency hopping is obtained by dividing a number of the total coded modulation symbols of the DAI information is divided by 2 and rounding down the dividing result. The other coded modulation symbols are carried in the second frequency hopping.

Optionally, in this embodiment, the above-mentioned processor may be configured to perform the following steps through the computer program: when the PDSCH performs frequency hopping in a frequency-domain, mapping the coded modulation symbols of the DAI information in a first frequency hopping, and when resources available in the first frequency hopping are insufficient, mapping and transmitting remaining coded modulation symbols of the DAI information in a second frequency hopping.

Optionally, in this embodiment, the above-mentioned processor may be configured to perform the following steps through the computer program: while transmitting the PDSCH based on semi-persistent scheduling to the receiving end, transmitting a first PDSCH based on DCI scheduling also. A serial number of the DAI in the PDSCH based on the semi-persistent scheduling and a serial number of the DAI in the first PDSCH are consecutive.

Optionally, in this embodiment, the above-mentioned processor may be configured to, through the computer program, perform the following steps that: when the PDSCH based on the semi-persistent scheduling and the first PDSCH based on the DCI scheduling are sent to the receiving end simultaneously, the serial number of the DAI in the first PDSCH includes a number of PDSCHs based on the semi-persistent scheduling, and the PDSCHs based on the semi-persistent scheduling do not include the DAI information. The PDSCHs based on the semi-persistent scheduling that do not include the DAI information are not consecutive to greater than M, and M is an integer greater than zero.

Optionally, in this embodiment, the above-mentioned processor may be configured to perform the following step through the computer program: transmitting a PUSCH carrying UAI information to the receiving end. The UAI information includes counter UAI information and/or total UAI information. The counter UAI information is used for indicating a number of PUSCHs that have been transmitted by a transmitting end in a configured carrier until a currently transmitted PUSCH. The total UAI information is used for indicating a sum of a number of PUSCHs that have been transmitted by the transmitting end in the carrier configured at the receiving end until a current transmission opportunity and a number of PUSCHs queued to be transmitted at the current transmission opportunity.

Optionally, in this embodiment, the above-mentioned processor may be configured to perform the following step through the computer program.

In step S11, a DCI activation command is received in a semi-persistent scheduling transmission, and the DCI activation command is used for instructing to activate a channel transmission; and a HARQ-ACK corresponding to the DCI activation command is fed back.

Optionally, in this embodiment, the above-mentioned processor may be configured to perform the following step through the computer program.

In step S21, a DCI activation command is sent to a receiving end. The DCI activation command carries a PUCCH resource indication field of an HARQ-ACK, and the PUCCH resource indication field of the HARQ-ACK is used for indicating resources of the HARQ-ACK for the DCI activation command in a slot or a subslot.

For specific examples in this embodiment, reference may be made to the examples described in the above-mentioned embodiments and alternative implementations, and the specific examples will not be repeated in this embodiment.

Obviously, a person having ordinary skill in the art would understand that the above modules and steps of the present disclosure can be realized by using a universal computing device, can be integrated in a single computing device or distributed on a network that consists of a plurality of computing devices; and alternatively, they can be realized by using executable program codes of the computing device, so that they can be stored in a storage device and executed by the computing device, in some cases, can perform the shown or described steps in a sequence other than herein, or they are made into various integrated circuit modules respectively, or a plurality of modules or steps thereof are made into a single integrated circuit module, thus to be realized. Thus, the present disclosure is not limited to any specific combination of hardware and software.

The above descriptions are merely optional embodiments of the present disclosure, which are not intended to limit the present disclosure. For those having ordinary skill in the art, the present disclosure may have various changes and variations. Any amendments, equivalent substitutions, improvements, etc. within the principle of the present disclosure are included in the scope of protection defined by the appended claims of the present disclosure.

The invention claimed is:

1. A method for sending index information, comprising:
transmitting a physical shared channel carrying the index information to a receiving end, wherein the index information is used for instructing the receiving end to count a number of the transmitting of the physical shared channel,
wherein transmitting the physical shared channel carrying the index information to the receiving end comprises:
transmitting a Physical Downlink Shared Channel (PDSCH) carrying downlink assignment index (DAI) information to the receiving end, wherein the DAI information comprises at least one of counter DAI information and total DAI information, the counter DAI information is used for indicating a number of PDSCHs that have been transmitted by a transmitting end in a carrier of the receiving end until a currently transmitted PDSCH, and the total DAI information is used for indicating a sum of a number of PDSCHs that have been transmitted by the transmitting end in the carrier of the receiving end until a current transmission opportunity and a number of PDSCHs queued to be transmitted at the current transmission opportunity,
wherein transmitting the PDSCH carrying the DAI information to the receiving end comprises:
sequentially repeating, encoding and modulating the DAI information to obtain coded modulation symbols of the DAI information; and
transmitting the obtained coded modulation symbols of the DAI information by using all or part of resource units in a physical resource block of the PDSCH.

2. The method according to claim 1, wherein
repeating the DAI information comprises: repeating the DAI information according to a pre-configured repetition value, wherein the repetition value is determined by at least one of: being instructed by a physical layer, being configured by higher-layer signaling, or agreeing on a default value in advance;

encoding the DAI information comprises: encoding the DAI information according to a pre-configured encoding mode, wherein the encoding mode of the DAI information is determined by at least one of: being determined to be same as an encoding mode of the PDSCH carrying the DAI information, being determined to be different from the encoding mode of the PDSCH carrying the DAI information, or agreeing on the encoding mode in advance; and modulating the DAI information comprises: modulating the DAI information according to a pre-configured modulation mode, wherein the modulation mode of the DAI information is determined by at least one of: being determined to be same as a modulation mode of the PDSCH carrying the DAI information, and agreeing on the modulation mode in advance.

3. The method according to claim 1, before repeating, encoding and modulating the DAI information, further comprising:

configuring a repetition value for the DAI information by at least one of:
configuring the repetition value for the DAI information in a Radio Resource Control (RRC) message used for configuring a downlink semi-persistent transmission parameter; and
configuring the repetition value for the DAI information in Downlink Control Information (DCI) used for activating a downlink semi-persistent transmission;
wherein configuring the repetition value for the DAI information in the DCI used for activating the downlink semi-persistent transmission comprises: configuring a set of repetition values by using the RRC message, and selecting a value from the set of repetition values for configuring the repetition value; or configuring the repetition value through the DCI.

4. The method according to claim 1, before transmitting the obtained coded modulation symbols of the DAI information by using the all or part of the REs in the physical resource block of the PDSCH, further comprising:

determining a number of REs used to transmit the coded modulation symbols according to the following equation:

$$R_{DAI} = \min\left\{\left\lceil \frac{(D+L) \cdot r \cdot RE_1}{\text{Data}} \right\rceil, \lceil A \cdot RE_1 \rceil\right\},$$

wherein $R_{DAI}$ represents the number of the REs used by the coded modulation symbols of the DAI information; D represents a number of bits of the DAI information; L represents a number of check bits of Cyclic Redundancy Check (CRC), and in a case where the number of bits of the DAI information is less than or equal to 11, L=0; $RE_1$ represents all RE resources able to be used for transmitting the PDSCH or able to be used for transmitting the DAI information, in the physical resource block allocated to the receiving end of a user equipment (UE) for transmitting the PDSCH; Data represents a number of data bits actually transmitted by the PDSCH; A is a coefficient and configured by the transmitting end; and r is a repetition value of the DAI information.

5. The method according to claim 1, before transmitting the obtained coded modulation symbols of the DAI information by using the all or part of the REs in the physical resource block of the PDSCH, further comprising:

determining an Orthogonal Frequency Division Multiplexing (OFDM) symbol used in the physical resource block of the PDSCH for the coded modulation symbols of the DAI information, wherein the used OFDM symbol comprises at least one of: an OFDM symbol immediately adjacent to an OFDM symbol of a reference signal in the physical resource block allocated for the PDSCH, and the OFDM symbol of the reference signal.

6. The method according to claim 5, before transmitting the obtained coded modulation symbols of the DAI information by using the all or part of the REs in the physical resource block of the PDSCH, further comprising:

mapping the coded modulation symbols of the DAI information on the OFDM symbol used in the physical resource block of the PDSCH, according to a preset first mapping rule; wherein the first mapping rule comprises: first mapping on REs that are not occupied by the reference signal in the OFDM symbol where the reference signal is located, and then mapping on REs in the symbol immediately adjacent to the reference signal; or comprised mapping only on the REs in the symbol immediately adjacent to the reference signal; or mapping the coded modulation symbols of the DAI information on the OFDM symbol used in the physical resource block of the PDSCH, according to a preset second mapping rule; wherein the second mapping rule comprises: performing the mapping on a first symbol of the PDSCH according to a discrete RE pattern, in a case where half of REs of the first symbol are not able to be full filled by remaining coded modulation symbols corresponding to the DAI information during the mapping; and a discrete RE interval is a value obtained by: dividing a number of the REs of the physical resource block of the PDSCH in the first symbol by a number of the remaining coded modulation symbols corresponding to the DAI information to obtain a result, and rounding the result up or down.

7. The method according to claim 1, wherein sequentially repeating, encoding and modulating the DAI information comprises:

when the DAI information comprises both the counter DAI information and the total DAI information, one of following operations is performed:
respectively calculating a number of RE resources or coded modulation symbols to be used by the counter DAI information and a number of RE resources or coded modulation symbols to be used by the total DAI information, and encoding and modulating the counter DAI information and the total DAI information respectively; or
taking the counter DAI information and the total DAI information as a whole, calculating a number of RE resources or coded modulation symbols to be used by the counter DAI information and the total DAI information as the whole, and encoding and modulating the counter DAI information and the total DAI information as the whole.

8. The method according to claim 1, wherein transmitting the obtained coded modulation symbols of the DAI information by using all or part of the REs in the physical resource block of the PDSCH comprises:

in a case where the PDSCH performs frequency hopping in a frequency-domain, dividing the coded modulation symbols of the DAI information into two parts, and mapping and transmitting the two parts respectively in a first frequency hopping and a second frequency hopping; wherein a number of coded modulation symbols of the DAI information carried in the first frequency hopping is obtained by dividing a number of total coded modulation symbols of the DAI information by 2 and rounding down the dividing result; and among the coded modulation symbols of the DAI information, coded modulation symbols other than the coded modulation symbols of the DAI information carried in the first frequency hopping are mapped and transmitted in the second frequency hopping.

9. The method according to claim 1, wherein transmitting the obtained coded modulation symbols of the DAI information by using the part or all of the REs in the physical resource block of the PDSCH comprises:
in a case where the PDSCH performs frequency hopping in a frequency-domain, mapping the coded modulation symbols of the DAI information in a first frequency hopping, and when resources available in the first frequency hopping are insufficient, mapping and transmitting remaining coded modulation symbols of the DAI information in a second frequency hopping.

10. The method according to claim 1, wherein transmitting the PDSCH carrying the DAI information to the receiving end comprises:
transmitting the PDSCH based on semi-persistent scheduling and a first PDSCH based on DCI scheduling to the receiving end simultaneously, wherein a serial number of the DAI in the PDSCH based on the semi-persistent scheduling and a serial number of the DAI in the first PDSCH are consecutive; and
in a case where the PDSCH based on the semi-persistent scheduling and the first PDSCH based on the DCI scheduling are transmitted to the receiving end simultaneously, the serial number of the DAI in the first PDSCH comprises a number of PDSCHs based on the semi-persistent scheduling, and the PDSCHs based on the semi-persistent scheduling do not comprise the DAI information; wherein the PDSCHs based on the semi-persistent scheduling that do not comprise the DAI information are not consecutive to greater than M, and M is an integer greater than zero.

11. A non-transitory computer-readable storage medium storing a computer program thereon, wherein the computer program is configured to perform the method according to claim 1 when executed.

12. An electronic device, comprising a memory and a processor; wherein the memory stores a computer program therein, and the processor is configured to execute the computer program to perform the method according to claim 1.

13. A method for sending index information, comprising:
transmitting a physical shared channel carrying the index information to a receiving end, wherein the index information is used for instructing the receiving end to count a number of the transmitting of the physical shared channel,
wherein transmitting the physical shared channel carrying the index information to the receiving end comprises:
transmitting a Physical Downlink Shared Channel (PDSCH) carrying downlink assignment index (DAI) information to the receiving end, wherein the DAI information comprises at least one of counter DAI information and total DAI information, the counter DAI information is used for indicating a number of PDSCHs that have been transmitted by a transmitting end in a carrier of the receiving end until a currently transmitted PDSCH, and the total DAI information is used for indicating a sum of a number of PDSCHs that have been transmitted by the transmitting end in the carrier of the receiving end until a current transmission opportunity and a number of PDSCHs queued to be transmitted at the current transmission opportunity,
wherein transmitting the PDSCH carrying the DAI information to the receiving end comprises:
transmitting the PDSCH based on semi-persistent scheduling and a first PDSCH based on DCI scheduling to the receiving end simultaneously, wherein a serial number of the DAI in the PDSCH based on the semi-persistent scheduling and a serial number of the DAI in the first PDSCH are consecutive; and
in a case where the PDSCH based on the semi-persistent scheduling and the first PDSCH based on the DCI scheduling are transmitted to the receiving end simultaneously, the serial number of the DAI in the first PDSCH comprises a number of PDSCHs based on the semi-persistent scheduling, and the PDSCHs based on the semi-persistent scheduling do not comprise the DAI information; wherein the PDSCHs based on the semi-persistent scheduling that do not comprise the DAI information are not consecutive to greater than M, and M is an integer greater than zero.

* * * * *